(12) United States Patent
Museth et al.

(10) Patent No.: US 11,392,731 B2
(45) Date of Patent: Jul. 19, 2022

(54) METHOD FOR SIMULATING COMBUSTION IN DIGITAL IMAGERY

(71) Applicant: Unity Technologies SF, San Francisco, CA (US)

(72) Inventors: Ken Museth, Wellington (NZ); John Edholm, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 17/076,709

(22) Filed: Oct. 21, 2020

(65) Prior Publication Data
US 2021/0312102 A1     Oct. 7, 2021

Related U.S. Application Data

(60) Provisional application No. 63/003,107, filed on Mar. 31, 2020.

(51) Int. Cl.
| | |
|---|---|
| *G06F 30/15* | (2020.01) |
| *F23C 99/00* | (2006.01) |
| *G06F 30/28* | (2020.01) |

(52) U.S. Cl.
CPC ............ *G06F 30/15* (2020.01); *F23C 99/001* (2013.01); *G06F 30/28* (2020.01); *F23C 2700/04* (2013.01)

(58) Field of Classification Search
CPC ...... G06F 30/15; G06F 30/28; G06F 2111/10; G06F 2113/08; G06F 2119/08;
(Continued)

(56) References Cited

U.S. PATENT DOCUMENTS

| | | | | |
|---|---|---|---|---|
| 7,479,963 B2* | 1/2009 | Lischinski | .............. | G06T 13/60 |
| | | | | 345/473 |
| 8,289,327 B1* | 10/2012 | Horvath | .................. | G06T 13/60 |
| | | | | 345/428 |
| 2013/0027407 A1* | 1/2013 | Henderson | .............. | G06T 13/60 |
| | | | | 345/473 |

FOREIGN PATENT DOCUMENTS

CN          110765698 A      2/2020

OTHER PUBLICATIONS

K.M. Pang et al., "Light-Duty Diesel Engine Modelling with Integrated Detailed Chemistry in 3-D CFD Study," Proceedings of ICEE 2009 3rd International Conference on Energy and Environment, pp. 266-271 (Year: 2009).*

(Continued)

*Primary Examiner* — Steven W Crabb
(74) *Attorney, Agent, or Firm* — Philip H. Albert; William T. Hoyer McCarthy; Haynes and Boone LLP

(57) ABSTRACT

A combustion simulation system is provided. The combustion simulation system can be performed using a computing device operated by a computer user or artist. The computer-implemented method of simulating a combustion process includes receiving a set of data representing a fluid flow. The fluid flow can include combustion precursors. The method includes simulating a chemical reaction representing simulated combustion of these precursors generating combustion byproducts. The method can include determining a change in temperature of the combustion byproducts due to the chemical reaction, determining a change in molar mass of the combustion byproducts due to the chemical reaction, determining a divergence of the combustion byproducts based on a combination of the change in the temperature and the change in molar mass, and generating data structures of the simulated combustion based on values of the fluid flow.

18 Claims, 6 Drawing Sheets

(58) Field of Classification Search
CPC .... G06F 30/20; F23C 99/001; F23C 2700/04; G06T 13/60; G06T 2210/24; F23N 2223/40; F23N 2225/00
See application file for complete search history.

(56) References Cited

OTHER PUBLICATIONS

Aglave, "CFD Simulation of Combustion Using Automatically Reduced Reaction Mechanisms: A Case for Diesel Engine," Dissertation University of Heidelberg, Feb. 23, 2007.
International Search Report and the Written Opinion of the International Search Authority, or the Declaration, dated Feb. 12, 2021, PCT/NZ2020/050138, 13 pages, ISA/EP.
Lu et al., "Experimental Studies on the Dual-Fuel Sequential Combustion and Emission Simulation," Energy, Elsevier, Amsterdam, Netherlands, vol. 51, Feb. 10, 2013, pp. 358-373.
Nielson et al., "Physics-Based Combustion Simulation in Bifrost," SIGGRAPH ' 19 Talks, Jul. 28-Aug. 1, 2019, Los Angeles, CA, USA.

\* cited by examiner

METHOD FOR SIMULATING COMBUSTION IN DIGITAL IMAGERY

CROSS-REFERENCE TO RELATED APPLICATIONS

This application claims the benefit of U.S. Provisional Application No. 63/003,107, filed on Mar. 31, 2020, which is incorporated by reference in its entirety for all purposes.

FIELD OF THE INVENTION

The present disclosure generally relates to modeling in computer graphics applications, and more particularly to efficient methods of computation used for simulating combustion reactions for use in generating computer-generated images depicting combustion reactions.

BACKGROUND

Combustion involves so many topics from both chemistry and physics that it is difficult to imagine anything more interdisciplinary. Obviously, chemical kinetics plays a central role, but so do several disciplines of physics, like thermodynamics, statistical mechanics, quantum mechanics, and fluid dynamics to mention just a few.

Combustion is surprisingly challenging from the perspectives of both understanding the fundamental chemical and physical processes, and modeling these processes on a computer. For example, simulating combustion requires an understanding of many advanced topics, such as discrete numerical analysis and multi-variable calculus. Further, accurate physical and chemical models of combustion model complex dynamic processes that occur within extremely short timeframes and at small length scales. For example, chemical reactions typically happen in femtosecond time scales, which produce local shock waves that propagate in the materials at the speed of sound. Regarding length scales, turbulent mixing of fuel and oxidizer plays an important role in non-premixed combustion, which is most common in nature, and occurs at Kolmogorov microscales (which can be as small a few molecules). Additionally, transport of heat, due to phenomena like convection, conduction, and radiation, is notoriously difficult to capture numerically.

Generally speaking, accurately modeling combustion events is not needed for computer graphics applications, which merely attempt to create realistic visual representations, if more efficient processes can used and do not materially affect visual results.

SUMMARY

A computer graphics system can generate computer-generated imagery, such as images or frames of a video sequence, that in part might include a visualization of combustion, such as a movie action scene wherein something combusts without there necessarily being a real-world combustion being recorded. It is often desirable that such visualization match well to what would appear in an actual combustion reaction. A computer-implemented method of simulating combustion processes might comprises steps under control of one or more computer systems configured with executable instructions, wherein the instructions provide for receiving a first set of data representing a fluid flow including a plurality of combustion precursors, simulating a chemical reaction representing simulated combustion of at least some of the plurality of these precursors generating combustion byproducts, determining a change in temperature of the combustion byproducts due to the chemical reaction, determining a change in molar mass of the combustion byproducts due to the chemical reaction, determining a divergence of the combustion byproducts based on a combination of the change in the temperature and the change in molar mass, generating one or more data structures of the simulated combustion based on values of at least a first portion of the fluid flow, and generating a visual representation of the simulated combustion based on the one or more data structures.

The combustion precursors might comprise at least two combustible components and/or at least one non-combustible component. Divergence can be determined based on the change in temperature over time, possibly based on the change in molar mass over time.

The method might further comprise simulating the combustion byproducts as a second portion of the fluid flow having a variable density, wherein the variable density of the fluid flow varies in response to the divergence of a velocity field pertaining to the fluid flow.

At least a second portion of a fluid flow might be treated as incompressible or as compressible.

The method might further comprise generating the one or more data structures of the simulated combustion based on a reduced number of the combustion byproducts.

The method might further comprise configuring the one or more data structures for use by an animation process when generating one or more visual representations of a combustion event, and might further comprise using a convolution kernel to simulate heat diffusion by blurring at least a portion of the one or more visual representations of the combustion event. The convolution kernel might be derived from a heat equation.

The combustion precursors might comprise a linear alkane. The combustion precursors might comprise one or more of methane, ethane, propane, butane, pentane, hexane, heptane, and/or octane.

A computer system for simulating combustion processes might comprise at least one processor and a computer-readable medium might store instructions, which when executed by the at least one processor, causes the system to carry out one or more of the methods described herein. A non-transitory computer-readable storage medium might store instructions, which when such instructions are executed by at least one processor of some computer system or process, causes the computer system or process to carry out one or more of the methods described herein.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
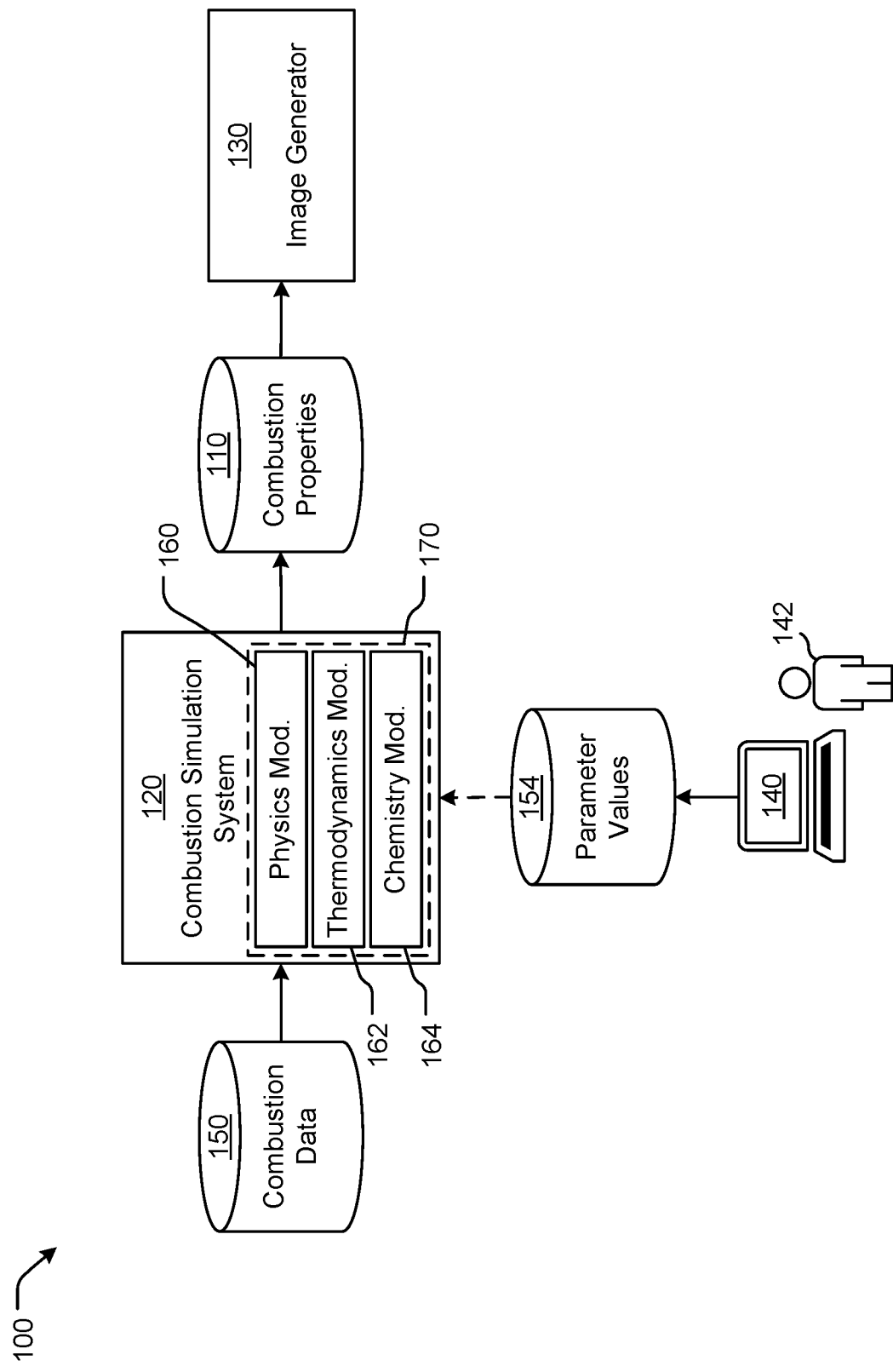
FIG. 1 is a diagram of a data flow through a system when the system is generating values of combustion properties, which may be used to create visual representations of simulated combustion or for other purposes.

FIG. 1 is a diagram of a data flow through a system 100 when the system 100 is generating values of combustion properties 110 (e.g., which may be stored in one or more data structures). The values of the combustion properties 110 are supplied to a process or system (e.g., an image generator 130, which might be used by itself or as a part of a system shown in FIG. 6). The methods here may be used by a process or system to create visual representations of simulated combustion or for other purposes. For ease of illustration, in FIG. 1, the values of the combustion properties 110 are illustrated as being supplied to an image generator 130 that uses the values for combustion properties 110 to create visual representations of simulated combustion.

In the physical world, combustion combines combustion reactants (or generally combustion precursors) and produces combustion products and heat (and optionally light in the form of photons). The combustion reactants may include oxygen and fuel molecules (e.g., hydrocarbons), which are broken down by the combustion into the combustion products. The combustion products may be molecules (e.g., water and carbon dioxide).

Depending upon the type of combustion, both the combustion reactants and the combustion products may be gases.

Because combustion is a process, combustion is typically simulated over a combustion duration and its parameter values are calculated periodically (e.g., at discrete times). Thus, at least some of the values of combustion properties 110 may include series of values, with a value corresponding to a different timestamp occurring during the combustion duration. An amount of time between a pair of successive timestamps will be referred to as a time step. While the time steps may be uniform in some examples, that might not necessarily be the case for all embodiments.

Components (e.g., liquids, solids, and/or gases) of a combustion simulation may be divided into a plurality of simulated objects (e.g., particles) and the properties of the simulated objects may be determined for each timestamp during the combustion duration. The simulated objects may be three-dimensional ("3D") and/or positioned within a 3D space. For example, the simulated objects may correspond to voxels within a 3D visualization. The values of combustion properties 110 may include the values of the properties of the simulated objects. By way of non-limiting examples, the properties of the simulated objects may include divergence (described below), temperature, location, and composition (e.g., fuel, oxygen, nitrogen, soot, carbon dioxide, water, and the like). In some instances, a set of parameters defining an initial state might specify a fuel, conditions, oxidizers, etc. but might also just specify some initial state that might not be specific to precursors or reactants described herein.

As illustrated in FIG. 1, the system 100 includes a combustion simulation system 120 and at least one client computing device 140 operated by at least one human artist 142. The combustion simulation system 120 may be implemented by software executing on one or more computer systems (e.g., each like a computer system 700 illustrated in FIG. 7).

Combustion has been studied and simulated for engineering and scientific purposes, such as for the purposes of propelling vehicles (e.g., space craft and rockets). Generally, such studies and simulations are concerned with changes occurring over short periods of time (e.g., on the order of a few microseconds). On the other hand, some computer graphics applications are concerned only with the appearance of combustion. Therefore, for such computer graphics applications, the combustion simulation system 120 is configured to generate a simplified combustion simulation that includes enough scientific calculations to generate a realistic looking combustion simulation but may employ models of various levels of accuracy of the physical and/or chemical reactions. The combustion simulation system 120 may also be configured to simulate combustion using a larger time step size than is typically used in engineering and scientific applications.

In some computer graphics applications, the combustion simulation system 120 can be configured to optimize computing efficiency by minimizing computational cycles to obtain the appearance of the combustion without including enough scientific calculations that would otherwise require for real world physical and/or chemical reactions, such as, for example, during simulation of a combustion reaction for a rocket thrustor. In other words, the combustion simulation system 120 is capable of reducing the number of parameters or variables, including for example, the number of byproducts, in the simulation to obtain an appearance of a combustion to produce a graphical representation of the combustion, rather than formulating detail calculations required, for example, for finite element simulation of the physical, chemical, thermodynamics and/or kinetics between the reactants and products of a combustion. In a non-limiting example, the combustion simulation system 120 can be configured so that the simulation produces the desired color of a flame (i.e., the appearance of the combustion), rather than determining the temperature that the combustion has to reach in order to produce the desired temperature color, and the various calculations of thermochemical reaction phenomena between reactants and products that would need to be detailed in order to produce the desired flame color.

The combustion simulation system 120 is configured to receive combustion data 150 and user-defined parameter values 154 as input, and is configured to output the values of the combustion properties 110. The combustion data 150 and/or the user-defined parameter values 154 may be stored by the combustion simulation system 120 and/or another device (e.g., a data storage) connected to the combustion simulation system 120. It should be understood that various elements being operated on, such as the values of the combustion properties 110, are stored as data that can be written to computer memory, read from computer memory, and transmitted between computer processes and/or components.

The combustion simulation system 120 may be characterized as implementing a plurality of solvers that interact with one another. For example, some of the solvers may each calculate a series of parameter values wherein each value in the series corresponds to a different discrete time value (or timestamp). In this manner, the series of parameter values represents how the parameter value changes over time during a combustion event. The solvers may be strongly or loosely coupled together so that different simulations may feed values to one another. In other words, different simulations may be executed simultaneously and, as the simulations step through time, the simulations may exchange parameter values (e.g., force values). The simulations may be configured to perform operator splitting, which means a solution for an original equation is obtained by splitting the original equation into multiple parts, solving each part separately, and combining the solutions.

The plurality of solvers implemented by the combustion simulation system 120 may be characterized as including a physics module 160, a thermodynamics module 162, and a chemistry module 164. However, this functionality need not be divided into multiple modules. Together, the physics module 160, the thermodynamics module 162, and the chemistry module 164 may be characterized as being a combustion model 170. The physics module 160 determines how parts (e.g., gases, fuel, soot, etc.) move during the simulated combustion. Thus, the physics module 160 may implement fluid mechanics. The thermodynamics module 162 determines how heat is transferred during the simulated combustion, which helps determine changes in temperature over time. The chemistry module 164 may implement an adiabatic flame model that helps determine the temperature obtained by the simulated combustion event. Temperature is generally used by the visual content generation system 600 (see FIG. 6) to determine color within the rendered image or for other uses.

The combustion parameter values 154 may include any parameters that will affect the appearance of a combustion event. By way of non-limiting examples, the combustion parameter values 154 may include an identifier of one or more combustion fuels, an amount of fuel, an atmospheric composition, an initial temperature, a constant thermodynamic pressure, and the like.

As described below, the visual content generation system 600 (see FIG. 6) is configured to receive the values of the combustion properties 110 as input, and is configured to output one or more static images and/or one or more animated videos. The static image(s) and/or the animated video(s) include one or more visual representations of combustion created based at least in part on the values of the combustion properties 110. The visual content generation system may transmit the static image(s) and/or the animated video(s) to the client computing device 140 for display to the artist 142. The artist 142 may use the static image(s) and/or the animated video(s) to view the visual representations of the combustion and make adjustments to the combustion parameter values 154. Then, the combustion simulation system 120 may output new values of the combustion properties 110, which the visual content generation system may use to output new versions of the static image(s) and/or the animated video(s) that may be viewed by the artist 142 on the client computing device 140. This process may be repeated until the artist 142 is satisfied with the appearance of the combustion in the static image(s) and/or the animated video(s).

As mentioned above, the client computing device 140 is configured to communicate with the combustion simulation system 120. The artist 142 may use the client computing device 140 to specify the combustion parameter values 154 to the combustion simulation system 120. Optionally, the combustion simulation system 120 may be configured to display the values of the combustion properties 110 and/or a simulation based at least in part on the values of the combustion properties 110 to the artist 142 on the client computing device 140 so that the artist 142 may adjust the combustion parameter values 154 as desired before the values of the combustion properties 110 are input into the visual content generation system. As mentioned above, the client computing device 140 is configured to receive the static image(s) and/or the animated video(s) and display the static image(s) and/or the animated video(s) to the artist 142 so that the artist 142 may adjust the combustion parameter values 154. The client computing device 140 may be implemented using the computer system 700 illustrated in FIG. 7.

The combustion model 170 may be characterized as being an alternative computational model for combustion that is faithful to the processes of combustion and configured to satisfy the turnaround times required for computer graphics applications. The particular values for the combustion parameter values 154 might be based on actual physically realizable combustion components, such as physical gases. However, an artist might select and input values that do not necessarily correspond to physically realizable combustion but nonetheless result in a desirable simulation and possible visual appearance in rendered imagery that the artist is targeting.

Fluid Dynamics of Combustion

Fluid mechanics is the study of fluid behavior (e.g., liquids and gases) at rest and in motion. The physics module 160 uses fluid mechanics equations to determine how each of the components of the combustion simulation (e.g., represented as simulated objects) moves during the simulated combustion event. The physics module 160 may determine a position for each simulated object for each discrete time period (e.g., timestamp) during the simulated combustion event.

Fluid mechanics is governed by Navier-Stokes equations that are derived from three fundamental laws, namely, conservation of linear momentum, conservation of mass, and conservation of energy. Traditionally, the field of computer graphics assumes that a fluid flow is incompressible. This assumption decouples the energy equation from the other two equations and more importantly leads to a time-independent boundary-value problem (elliptic partial differential equation ("PDE")) for pressure, in lieu of a time-dependent initial value problem that propagates pressure at the speed of sound in a compressible fluid.

While no fluid is truly incompressible, it is a common assumption for most fluid applications in computer graphics, like modeling water, smoke, and the like. However, combustion is a notable exception because, the significant temperature changes caused by the chemical reactions result in very pronounced local pressure and density changes. Additionally, most combustion events break large fuel molecules (e.g., hydrocarbons) into many smaller product molecules (e.g., water and carbon dioxide) which can also cause the fluid to expand, contradicting the notion of an incompressible fluid. Thus, an accurate way to model combustion is through general compressible Navier-Stokes equations that allow for sharp changes in density and pressure (shocks) that propagate at an acoustic speed of the fluid.

As mentioned above, the Navier-Stokes equations are derived from the conservation of linear momentum, conservation of mass, and conservation of energy.

Conservation of Momentum

Equation 1 below is the Navier-Stokes equation for a Newtonian fluid, which is derived from conservation of linear momentum (or Newton's second law applied to fluids), also known as the Navier-Stokes Momentum Equation.

$$\rho\left(\frac{\partial \vec{u}}{\partial t} + \vec{u} \cdot \nabla \vec{u}\right) = \nabla P_{mech} + \rho \vec{g} + \mu \nabla^2 \vec{u} \quad \text{(Eqn. 1)}$$

In Equation 1 above, a variable "$\vec{u}$" represents a velocity vector of a moving fluid (e.g., measured in meters per second "m/s"), a variable "t" represents time (e.g., measured in seconds "s"), a variable "ρ" represents density (e.g., measured in kilograms per meter cubed "kg/m$^3$"), a variable "$P_{mech}$" represents mechanical pressure (e.g., measured in Newtons per meter squared "N/m$^2$"), a variable "$\vec{g}$" represents a gravity vector (e.g., measured in Newtons N), and a variable "μ" represents dynamic viscosity (e.g., measured in kilograms per meter second "kg/(ms)").

A computer graphics system used to generate realistic imagery, such as images and video frames, might be programmed to compute values using the Navier-Stokes Momentum Equation with artist-selected input values and use those computed values to simulate combustion and determine pixel values, such as pixel color values, for imagery created to depict such combustion. In some embodiments, computer resources, such as computational cycles, are at a premium and therefore efficient computational processes for computing results of the Navier-Stokes Momentum Equation and other equations described herein might be important.

In the Navier-Stokes Momentum Equation, the variable "$P_{mech}$" represents mechanical pressure and is defined as total force acting on a unit area. The mechanical pressure is normally indistinguishable from thermodynamic pressure, represented by a variable "$P_{therm}$" below. However, compressible fluids are notable exceptions. In Equation 1, an expression "$\frac{\partial \vec{u}}{\partial t}$"

denotes local acceleration of the fluid, an expression "$\vec{u} \cdot \nabla \vec{u}$" describes self-advection (e.g., hyperbolic transport by itself), an expression "$\nabla P_{mech}$" represents force caused by mechanical pressure differences (e.g., internal force), an expression "$\rho \vec{g}$" represents force caused by gravitational pull on mass (e.g., external force), and an expression "$\mu \nabla^2 \vec{u}$" represents drag due to viscosity, (e.g., parabolic diffusion of velocity). This set of three (Cartesian axis) coupled PDEs is shared with traditional incompressible fluid models in computer graphics and there are several well-established techniques to solve Equation 1 (e.g., stable fluids or FLIP).

Conservation of Mass

This section explains how a derivation that leads to an approximation of incompressible flows, and explains where and why assuming incompressibility fails for combustion simulations, and this can be used to optimize a computer process that is simulating combustion for visualization purposes.

A modified elliptic PDE is provided that more correctly accounts for rapid and local release of chemical energy, which is arguably a fundamental characteristic of combustion. Equation 2 calculates a mass flow rate (represented by an expression "$\frac{dM}{dt}$")

through a small closed regular surface represented by a variable "∂Ω." Referring to Equation 2 below, the surface represented by the variable "∂Ω" encloses a volume represented by a variable "Ω" (e.g., a voxel and its six faces). A material with a local density represented by the variable "ρ" is transported (e.g., moves) with a local velocity vector represented by the variable "$\vec{u}$." A variable "$\vec{n}$" represents an outward facing surface normal of the surface represented by the variable "∂Ω." Equation 2 calculates a total amount of mass passing though the surface per unit time caused by local flux of mass represented by an expression "$\vec{J}_m$," which equals the local density multiplied by the local velocity vector (which is represented in Equation 2 by an expression "$\rho \vec{u}$").

$$\frac{dM}{dt} = -\oint_{\partial \Omega} \vec{n} \cdot \vec{J}_m dS = -\oint_{\partial \Omega} \vec{n} \cdot (\rho \vec{u}) dS \quad \text{(Eqn. 2)}$$

Referring to Equation 3 below, according to the (classical) law of conservation of mass, the mass flow rate represented by the expression "$\frac{dM}{dt}$"

is equal to a total change of material per unit time in the enclosing volume (represented by the variable "Ω"), because the enclosing volume (represented by the variable "Ω") and volume element (represented by an expression "dV") are independent of time.

$$\frac{dM}{dt} = \frac{d}{dt}\int_\Omega \rho \, dV = \int_\Omega \frac{\partial \rho}{\partial t} dV \quad \text{(Eqn. 3)}$$

Subtracting Equation 2 from Equation 3 leads to a fundamental relation represented by Equation 4 below.

$$\int_\Omega \frac{\partial \rho}{\partial t} dV + \oint_{\partial \Omega} \vec{n} \cdot (\rho \vec{u}) dS = 0 \quad \text{(Eqn. 4)}$$

Applying the divergence theorem to the second term of Equation 4 yields Equation 5 below.

$$\int_\Omega \left(\frac{\partial \rho}{\partial t} + \nabla \cdot (\rho \vec{u})\right) dV = 0 \quad \text{(Eqn. 5)}$$

Because Equation 5 is true for any enclosing volume (represented by the variable "Ω"), applying the product rule to a term "$\nabla \cdot (\rho \vec{u})$" of Equation 5, yields Equation 6. Equation 6 may be characterized as being a fundamental equation referred to as a continuity equation that holds true for both compressible fluid flows and incompressible fluid flows.

$$\frac{\partial \rho}{\partial t} + \nabla \cdot (\rho \vec{u}) = \frac{\partial \rho}{\partial t} + \vec{u} \cdot \nabla \rho + \rho \nabla \cdot \vec{u} = 0 \qquad \text{(Eqn. 6)}$$

Equation 7 and Equation 8 involve an infinitesimal fluid particle with density (represented by the variable "ρ") at time (represented by the variable "t"), traveling along a trajectory (or streamline of the flow) represented by an expression "$\vec{x}(t)$." The expression "$\vec{x}(t)$" is obtained from a definition $$\text{``}\frac{d\vec{x}}{dt} \equiv \vec{u}.\text{''}$$

Mathematically, this implies that density (represented by the variable "ρ") can be represented by a function "$\rho(\vec{x}(t), t)$" with bold explicit and implicit time-dependencies. Using the chain rule, the function "$\rho(\vec{x}(t), t)$" can be used to derive a material (or total) derivative with respect to time, which is shown in Equation 8.

$$\frac{D\rho}{Dt} \equiv \frac{d\rho(\vec{x}(t), t)}{dt} = \frac{\partial \rho}{\partial t} + \frac{dx}{dt}\frac{\partial \rho}{\partial x} + \frac{dy}{dt}\frac{\partial \rho}{\partial y} + \frac{dz}{dt}\frac{\partial \rho}{\partial z} \qquad \text{(Eqn. 7)}$$

$$= \frac{\partial \rho}{\partial t} + \vec{u} \cdot \nabla \rho \qquad \text{(Eqn. 8)}$$

Equation 8 can be substituted onto Equation 6 above to create Equation 9, which is an alternative formulation of the continuity equation.

$$\frac{D\rho}{Dt} + \rho \nabla \cdot \vec{u} = 0 \qquad \text{(Eqn. 9)}$$

By definition, a flow is incompressible when the total derivative (with respect to time) of the density is zero, which can be expressed as $$\text{``}\frac{D\rho}{Dt} = 0.\text{''}$$

Thus, for an incompressible flow, $\rho \nabla \cdot \vec{u} = 0$. Equation 10 below may be derived when $\rho > 0$. Equation 10 applies if and only if a flow is incompressible, meaning the flow has a flow field that is divergence free.

$$\nabla \cdot \vec{u} = 0 \qquad \text{(Eqn. 10)}$$

If this constraint is applied to the velocity of Equation 6 (the continuity equation), Equation 11 may be obtained. Equation 11 may be characterized as being a transport equation for density in an incompressible flow, which is consistent with setting Equation 8 equal to zero. Thus, Equation 11 may be characterized as expressing the evolution of the density in an incompressible flow.

$$\frac{\partial \rho}{\partial t} = -\vec{u} \cdot \nabla \rho \qquad \text{(Eqn. 11)}$$

As an even stricter assumption, the fluid itself (in addition to its flow) may be assumed to be incompressible, which by definition implies that the density of the fluid is constant both with respect to time and space. In other words $$\frac{\partial \rho}{\partial t} = 0$$

and $\nabla \rho = 0$. Inserting this assumption into Equation 6 leads to the same condition for the flow field, namely Equation 10. A flow can be incompressible, $$\frac{D\rho}{Dt} = 0,$$

while the fluid is compressible. But, an incompressible fluid always implies that the flow is also incompressible. This is an important yet subtle and often overlooked detail in computer graphics literature on fluid animation, where the terms incompressible flow and incompressible fluid are typically used interchangeably. The justification is that, in computer graphics, the density is often assumed to be constant, which implies that both the fluid and the flow are incompressible. But, in the case of combustion simulation, the density varies due to the chemical reaction, so it is important to consider that the fluid being compressible alone does not necessarily imply that the flow is also compressible. That is, variable density fluids can still be governed by incompressible flows, which is exactly the reason why most existing combustion models in computer graphics assume flows are incompressible.

However, the fluid mechanics of combustion is inherently compressible, not merely because the density varies, but due to the way that it varies $$\frac{D\rho}{Dt} \neq 0.$$

For example, Equation 12 is an equation of state of ideal gases and establishes a simple relationship between the following state variables: thermodynamic pressure (represented by the variable "$P_{therm}$"), volume (represented by the variable "V"), and the absolute temperature (represented by the variable "T" and measured in Kelvin). Additionally, in Equation 12, a variable "n" represents a number of moles and a variable "R" represents an ideal gas constant (8.314 joules per mole Kelvin ("J/molK")).

$$P_{therm} V = nRT \qquad \text{(Eqn. 12)}$$

As mentioned above, the thermodynamic pressure (represented by the variable "$P_{therm}$") is generally different from the mechanical pressure (represented by the variable "$P_{mech}$"), which appears in Equation 1 (the Navier-Stokes Momentum Equation). Formally, the relationship between the thermodynamic pressure and the mechanical pressure is expressed in Equation 13 below. In Equation 13, a variable "γ" is a material property of the fluid called an expansion (or bulk) viscosity and has a value that is greater than or equal to zero.

$$P_{mech} = P_{therm} - \gamma \nabla \cdot \vec{u} \qquad \text{(Eqn. 13)}$$

In most cases, the value of the variable "γ" is small enough that the thermodynamic and mechanical pressures are identical. Obviously, for incompressible flows, the thermodynamic and mechanical pressures are exactly equal because $\nabla \cdot \vec{u} = 0$. But, as mentioned earlier, combustion is a notable exception. However, this will not complicate the combustion model 170 if combustion is limited to occurring in open air, which implies that the thermodynamic pressure is fixed to atmospheric pressure (or approximately 1 atmosphere ("atm")). Unless indicated otherwise, the remainder of this description assumes that combustion takes place at a constant thermodynamic pressure, which is a very common assumption in chemistry, fundamentally satisfied by most laboratory experiments performed in open air. Equation 14 below, is a rewritten version of the ideal gas law. In Equation 14 below, a variable "m" represents mass and a variable "M" represents molar mass. The density (represented by the variable "ρ") is defined by an expression "m/V" and the number of moles (represented by the variable "n") is defined by an expression m/M.

$$\rho \equiv \frac{m}{V} = \frac{m P_{therm}}{nRT} = \frac{P_{therm} M}{RT} \qquad \text{(Eqn. 14)}$$

Note that Equation 14 assumes that the absolute temperature (represented by the variable "T" and measured in Kelvin) is greater than zero. The ideal gas law is most accurate for (monatomic) gases at high temperatures and low pressures. The ideal gas law states that the density of a gas at constant thermodynamic pressure is inversely proportional to the absolute temperature. Calculating the total derivative with respect to time yields Equation 15.

$$\frac{D\rho}{Dt} = \frac{P_{therm}}{RT} \left( \frac{DM}{Dt} - \frac{M}{T} \frac{DT}{Dt} \right) \qquad \text{(Eqn. 15)}$$

Combining Equation 15 with Equation 8 yields Equation 16.

$$\frac{\partial \rho}{\partial t} = -\nabla \rho \cdot \vec{u} + \frac{P_{therm}}{RT} \left( \frac{DM}{Dt} - \frac{M}{T} \frac{DT}{Dt} \right) \qquad \text{(Eqn. 16)}$$

In Equation 16, a first term "$-\nabla \rho \cdot \vec{u}$" accounts for advection, which is the transport of the density (represented by the variable "ρ") by the velocity field (represented by the variable "$\vec{u}$"). A second term $$\text{"}\frac{P_{therm}}{RT} \left( \frac{DM}{Dt} - \frac{M}{T} \frac{DT}{Dt} \right)\text{"}$$

in Equation 16 accounts for the fact that, under constant thermodynamic pressure, the density increases when the molar mass of the moving fluid increases and the density decreases when the temperature of the moving fluid increases. Note, however, that the rate of change of the density decreases with rising temperature. More precisely, the proportionality factor for the rate of the density change caused by a change of molar mass depends on an expression "$T^{-1}$" whereas the proportionality factor varies as an expression "$T^{-2}$" caused by absolute temperature changes. In other words, the effect of temperature changes diminishes faster than the effect of changes in molar mass (e.g., changing mass of molecules as the molecules transition from reactants to products). As illustrated by contrasting Equation 16 with the transport equation represented by Equation 11 for incompressible flows, the combustion model 170 accounts for the combined effects of changing temperatures and changing molecular masses. Equation 9 and Equation 15 may be combined into Equation 17 below, which is an elliptic PDE for the flow field.

$$\nabla \cdot \vec{u} = \frac{P_{therm}}{\rho RT} \left( \frac{M}{T} \frac{DT}{Dt} - \frac{DM}{Dt} \right) \qquad \text{(Eqn. 17)}$$

As mentioned above, an expression "$\nabla \cdot \vec{u}$" is the divergence. In Equation 17, an expression $$\text{"}\frac{DT}{Dt}\text{"}$$

represents the temperatures of the moving fluids and an expression $$\text{"}\frac{DM}{Dt}\text{"}$$

represents the molar mass of the moving fluids. Thus, in regions with increasing temperatures of moving fluids (where the expression $$\text{"}\frac{DT}{Dt}\text{"}$$

is greater than zero), or decreasing molar mass (where the expression $$\text{"}\frac{DM}{Dt}\text{"}$$

is less than zero), the divergence of the velocity field is positive (or $\nabla \cdot \vec{u} > 0$), corresponding to an expansion. Conversely, regions with decreasing temperatures (e.g., due to cooling of products) or increasing molar mass (e.g., due to the formation of heavier molecules), the divergence is negative (or $\nabla \cdot \vec{u} < 0$), corresponding to local compression or contraction. Finally, in regions with no temperature and molar mass changes (e.g., ambient air or fuel far from regions of combustion), the flow is incompressible (or $\nabla \cdot \vec{u} = 0$). In other words, if the material derivative of the temperature and molar mass is equal to zero (or $$\frac{DT}{Dt} = \frac{DM}{Dt} = 0),$$

the material derivative of the density is also equal to zero. Thus, the flow is by definition incompressible and divergence free. In other words, if the cause of temperature or molar mass changes is only material transport (or hyperbolic advection), the cause of the change of density is also only material transport (or hyperbolic advection) and the flow remains incompressible. However, during combustion, both temperature and molar mass change due to several different processes other than just simple material transport. Before deriving expressions for $$\frac{DM}{Dt} \text{ and } \frac{DT}{Dt},$$

a description of some fundamentals of thermodynamics as well as the chemistry of combustion is provided, as might be used in a computer system that simulates combustion and related processes. In some aspects, ideal simulations for modeling materials, designing equipment, determining safety, and/or other processes might require a certain level of detail, and for computer graphics purposes, simplified (or more complex) operations might be used instead, where such operations provide acceptable graphics outputs.

Some Fundamentals of Thermodynamics as Might be Used for Graphics Simulations

As mentioned above, the thermodynamics module 162 determines how heat is transferred during the simulated combustion, which helps determine changes in temperature over time. The thermodynamics module 162 uses thermodynamics equations to help determine the temperature of the components of the combustion simulation (e.g., represented as simulated objects) during the simulated combustion event. The thermodynamics module 162 may help determine the temperature of each simulated object for each discrete time period (e.g., timestamp) during the simulated combustion event.

Combustion might be simulated as being governed both by chemical kinetics and thermochemistry of an underlying reaction that converts fuel and oxidizer into combustion products. Accurately modeling chemical kinetics of combustion reactions may be too complex for many computer graphics applications (e.g., involving numerous chemical reactions and sub-species). Instead, these reactions may be simplified (e.g., as explained in a Chemistry of Combustion section below) and it may be assumed that the reactions continue to completion. The effects of chemical equilibrium may be ignored.

Internal Energy

According to the first law of thermodynamics, a change of internal energy (represented by an expression "ΔU") in a closed system is a sum of heat (represented by a variable "Q") added to the closed system and an amount of work performed on the closed system. Traditionally this is expressed as Equation 18.

$$\Delta U = Q - W \tag{Eqn. 18}$$

In Equation 18, a variable "W" represents work performed by the closed system on its surroundings. In other words, the variable "W" represents energy used by the closed system to perform mechanical work, such as compressing or expanding its volume. Heat (represented by the variable "Q") is energy added to the closed system, which is not mechanical. In other words, the variable "Q" represents thermal energy caused by temperature differences between the closed system and its surroundings. While neither the work nor the heat are state functions because they depend on the path versus final and initial states taken by the closed system, the internal energy is a state function.

Enthalpy

A variable "H" represents enthalpy, which is defined by Equation 19 below. In Equation 19, a variable "U" represents the internal energy, the variable "$P_{therm}$" represents the thermodynamic pressure, and a variable "V" represents a volume of the closed system.

$$H = U + P_{therm} V \tag{Eqn. 19}$$

Given Equation 18 above, which is the first law of thermodynamics, a change of enthalpy (represented by an expression "ΔH") may be expressed by Equation 20.

$$\Delta H = \Delta U + \Delta(P_{therm} V) = Q - W + \Delta(P_{therm} V) \tag{Eqn. 20}$$

As mentioned above, the thermodynamic pressure (represented by the variable "$P_{therm}$") is assumed to be constant, which implies that the work (represented by the variable "W") is limited to volume change. In other words, $W = P_{therm} \Delta V$. Thus, Equation 20 above may be simplified to Equation 21 below. The work described by an expression "$P_{therm} \Delta V$" is referred to herein as "PV-work."

$$\Delta H = Q \tag{Eqn. 21}$$

In other words, for a closed system, at constant thermodynamic pressure, the enthalpy change equals energy transferred from the environment through heat transfer (or work other than PV-work).

An adiabatic process is defined as a process in which a closed system does not exchange any heat with its surroundings. In other words, the value of the variable "Q" equals zero for an adiabatic process. Therefore, Equation 21 above reduces to Equation 22 below for an adiabatic process under constant pressure (isobaric).

$$\Delta H = 0 \tag{Eqn. 22}$$

Thus, enthalpy is preserved (or equals zero) for any thermodynamic process of a close system, which is both adiabatic and isobaric. As mentioned above, the combustion model 170 models combustion events in open air, which has a constant atmospheric thermodynamic pressure. The combustion model 170 models reactions assumed to be so fast that no heat is exchanged with the surroundings. Thus, only work is volume change(s) performed at constant thermodynamic pressure. This assumption is not valid for combustion occurring inside a closed chamber, like most combustion engines. However, it is a reasonable assumption for deflagrations in open air, but not detonations that are accompanied by shock waves. Shock waves can require modeling of acoustic pressure propagation and in some embodiments, combustion model 170 can be used for combustion events simulated as occurring in open air and might exclude those combustion events that have significant acoustic pressure propagation components.

Heat Capacity

Combustion may be characterized as being driven by two processes, namely, the release of heat and transfer of heat. Both of these processes manifest in temperature changes throughout the fluid. In thermodynamics, the amount of heat, required to increase the temperature of one kilogram of a substance by one Kelvin is referred to as a specific heat capacity. In Equation 23 below, the specific heat capacity is represented by a variable "C." As mentioned above, heat is represented by the variable "Q." If a number of joules of heat is required to change the temperature of one kilogram of the substance by a particular amount (represented by the expression "$\Delta T$"), the specific heat capacity is equal to an expression "$C = \frac{Q}{\Delta T}$."

Equation 21 states $\Delta H = Q$. Thus, under the assumption of PV-work only, the specific heat capacity at constant thermodynamic pressure (represented by a variable "$C_P$") may be expressed in terms of enthalpy by an expression "$C_P = \frac{\Delta H}{\Delta T}$."

The expression

"$C_P = \frac{\Delta H}{\Delta T}$"

may be expressed in differential form as Equation 23.

$$C_P = \left(\frac{\partial H}{\partial T}\right)_P \quad \text{(Eqn. 23)}$$

Equation 23 may be particularly useful for combustion because combustion typically satisfies these assumptions and since enthalpy, unlike heat, is in fact a state variable. Equation 23 can be rewritten in differential form as an expression "$dH = C_P\, dT$," which may be written in integral form as Equation 24. In Equation 24, a variable "$H_1$" represents an initial enthalpy and a variable "$H_2$" represents a final enthalpy.

$$\int_{H_1}^{H_2} dH = H_2 - H_1 = \Delta H = \int_{T_1}^{T_2} C_P\, dT \quad \text{(Eqn. 24)}$$

In Equation 24, an initial state has an initial temperature (represented by a variable "$T_1$") and a final state has a final temperature (represented by a variable "$T_2$"). This leads to an important relation expressed in Equation 25 below.

$$H_2 = H_1 + \int_{T_1}^{T_2} C_P\, dT \quad \text{(Eqn. 25)}$$

A term "$\int_{T_1}^{T_2} C_P\, dT$" in Equation 25 is referred to as a thermal or sensible enthalpy, which distinguishes the term "$\int_{T_1}^{T_2} C_P\, dT$" from other types of enthalpy related to the chemistry of combustion.

The specific heat capacity at constant thermodynamic pressure (represented by the variable "$C_P$") typically varies with temperature so Equation 26 is a common Taylor-series approximation of the specific heat capacity at constant thermodynamic pressure.

$$C_P(T) = \alpha + \beta T + \gamma T^2 \quad \text{(Eqn. 26)}$$

Equation 26 can be substituted into Equation 25 to create Equation 27 below.

$$H_2 = H_1 + \alpha(T_2 - T_1) + \frac{\beta}{2}(T_2^2 - T_1^2) + \frac{\gamma}{3}(T_2^3 - T_1^3) \quad \text{(Eqn. 27)}$$

The polynomial coefficients $\alpha$, $\beta$, and $\gamma$ may be obtained from tables (and/or included in the combustion data 150) for the chemical components. Further, the initial temperature (represented by a variable "$T_1$") is known for most combustion events. So, if the initial and final enthalpies (represented by the variables "$H_1$" and "$H_2$," respectively) are also known, Equation 27 can be solved (numerically) for the final temperature (represented by the variable "$T_2$").

At this point, Equation 19 has introduced the enthalpy state variable (variable "H"), which has been shown to correspond to heat when the thermodynamic pressure is fixed (see Equation 21), and consequently that enthalpy is a conserved quantity for any adiabatic (no heat exchange) and isobaric process. This means enthalpy may be used to study the fast chemical reactions that occur during combustion when the thermodynamic pressure is constant. Finally, Equation 25 defines sensible (or thermal) enthalpy as the transfer of heat due to temperature differences (separate from the chemical reaction). However, there are other ways to introduce heat into a system and, for combustion, they are related to chemical reactions, which will be discussed in the next section.

Chemistry of Combustion and Use in Computer Graphics

As mentioned above, the chemistry module 164 may implement an adiabatic flame model. The chemistry module 164 uses the adiabatic flame model to determine the temperature obtained by the components of the combustion simulation (e.g., represented as simulated objects) during the simulated combustion event. The chemistry module 164 may determine a temperature for each simulated object for each discrete time period (e.g., timestamp) during the simulated combustion event. From these determinations, a computer system can simulate combustion in sufficient detail for use in generating computer-generated imagery.

In part, combustion can be modeled as fuel and an oxidizer (e.g., oxygen or oxygen-bearing molecules) reacting to form combustion outputs. Typically heat is also required, to initiate combustion to a state where the combustion provides enough output heat to continue the reaction until the fuel is consumed or the oxidizer is depleted. Combustion is a chemical reaction wherein the heat involved is a significant factor in how the reaction evolves. Combustion, once started, will end once the fuel is consumed, the oxidizer is depleted, or if sufficient heat is removed to stop the combustion reaction, but can continue until fuel is consumed and the oxidizer is depleted if the heat is not removed. In part, this is because combustion involves the release of heat (or enthalpy at constant pressure) due to the exothermic chemical reactions that turn cold fuel and oxidizer into hot products that heat up surrounding fuel and oxidizer resulting in a chain reaction. This enthalpy of reaction and the enthalpy required to turn the products into their constituent elements being lower than that of the reactants, should be taken into account when simulating combustion. When simulating combustion for the purposes of depicting the simulated combustion graphically, the fuel, oxidizer, and heat can be taken into account and aspects of those, or other details, can be ignored—thus potentially saving computational effort—if those details do not affect the visualization in graphical depictions involving that combustion.

Figure 2:
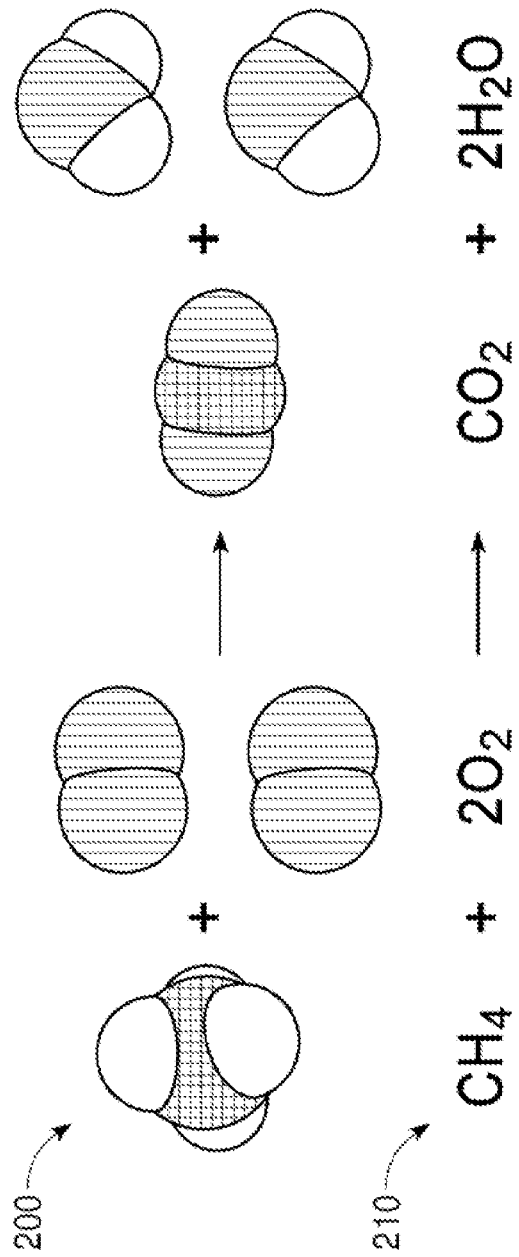
FIG. 2 illustrates an example chemical reaction between one unit of methane and two units of oxygen that produces one unit of carbon dioxide and two units of water, all in a gaseous state, as an example of combustion that might be simulated in a computer graphics process.

FIG. 2 illustrates an example of a chemical reaction occurring during combustion. A top portion 200 of FIG. 2 illustrates methane combustion by means of the molecular structures of reactants and products. A bottom portion 210 of FIG. 2 illustrates a stoichiometric reaction of the combustion of methane. Specifically, FIG. 2 illustrates a complete, or stoichiometric, reaction between one unit of methane with two units of oxygen to produce one unit of carbon dioxide and two units of water, all in a gaseous state. The actual chemical reaction is far more complicated, involving hundreds of sub-steps each with their own rates of reaction, and is beyond the scope of most computer graphics applications. Instead, it is assumed a single reaction happens instantaneously (so chemical kinetics can be ignored) and completely (so no equilibrium).

The reaction in FIG. 2 assumes that combustion takes place in pure oxygen. While this is a common mistake in computer graphics literature, in reality, most practical combustion events take place in atmospheric air, which is not pure oxygen. While this may seem irrelevant from the perspective of breaking and forming chemical bonds, it can have a profound impact on physical processes like transfer of heat and material, and can indirectly impact the chemistry by shifting the balance of a perfectly balanced or stoichiometric, reaction. This can lead to phenomena like oxygen starvation and entirely different chemical reactions that form new products, such as like soot, partially combusted fuel, and the like. To better account for these effects, in Equation 28, the atmospheric air is assumed to include 78.2% nitrogen, 21% oxygen, and other gases are ignored.

$$CH_4 + 2(O_2 + 3.76N_2) \rightarrow CO_2 + 2(H_2O + 3.76N_2)$$ (Eqn. 28)

Equation 28 includes a perfectly balanced ratio of methane and oxygen and produces what is referred to as complete combustion. If, instead, an excess of oxidizer is present, the reaction may be represented by Equation 29. In Equation 29, a coefficient "u" has a value greater than two. Equation 29 produces what is referred to as fuel-lean combustion.

$$CH_4 + \alpha(O_2 + 3.76N_2) \rightarrow CO_2 + 2H_2O + (\alpha - 2)O_2 + 3.76\alpha N_2$$ (Eqn. 29)

If, instead, an excess of methane is present, the reaction may be represented by Equation 30 below. In Equation 30, the coefficient "α" has a value greater than zero and less than two. Equation 30 produces what is referred to as fuel-rich combustion.

$$CH_4 + \alpha(O_2 + 3.76N_2) \rightarrow$$ (Eqn. 30)
$$\frac{\alpha}{2}CO_2 + \alpha H_2O + \left(1 - \frac{\alpha}{2}\right)CH_4 + 3.76\alpha N_2$$

The coefficient "α" is closely tied to this specific reaction so it is often convenient to introduce a different metric that is independent of the reaction. A fuel-to-oxidizer equivalence ratio (represented by a variable "λ") is defined as an actual fuel-to-oxidizer ratio to the stoichiometric fuel-to-oxidizer ratio. When the value of the variable "λ" is greater than one, the reaction is fuel-rich or more fuel is present than required for complete combustion, regardless of the type of fuel and oxidizer. Conversely, when the value of the variable "λ" is less than one, the mixture includes excess oxidizer. Thus, the term "rich" means excess fuel is present (the value of the variable "λ" is greater than one), the term "stoichiometric" means a balanced ratio (the value of the variable "λ" equals one), and the term "lean" means excess oxidizer is present (the value of the variable "λ" is less than one).

While many different types of fuel exist, for the sake of brevity, the combustion model 170 will be described with respect to fossil fuels, including linear alkanes (acyclic saturated hydrocarbons) having a form "$C_2H_{2n+2}$." Non-limiting examples of linear alkanes include natural gases like methane ($CH_4$), ethane ($C_2H_6$) propane ($C_3H_8$), butane ($C_4H_{10}$), pentane ($C_5H_{12}$), hexane ($C_6H_{14}$), heptane ($C_7H_{16}$), and octane ($C_8H_{18}$). These fuels can be referred to as combustion precursors or combustion reactants. For example, stoichiometric combustion of $C_xH_y$ in atmospheric air is described by Equation 31 below.

$$C_nH_{2n+2} + \alpha_n(O_2 + 3.76N_2) \rightarrow nCO_2 + (n+1)H_2O + 3.76\alpha_n N_2$$ (Eqn. 31)

In Equation 31, a constant "$\alpha_n$" expresses a number of oxygen molecules required to completely combust one molecule of $C_nH_{2n+2}$. The constant "an" is defined by Equation 32 below.

$$\alpha_n = \frac{3n+1}{2}$$ (Eqn. 32)

To further complicate matters, most combustion events in atmospheric air are not premixed. Instead pure fuel (e.g., $C_nH_{2n+2}$) interacts with atmospheric air and mixing takes place in a thin interface between fuel and the atmospheric air. Such mixing is caused by diffusion and is referred to as a diffusion flame. This can produce arbitrary fractions of the fuel and oxidizer, which, in general, has to be estimated before the reaction can be deduced. Thus, in general, concentrations of at least fuel (e.g., $C_nH_{2n+2}$), oxidizer ($O_2$), nitrogen ($N_2$), water ($H_2O$), and carbon dioxide ($CO_2$) must be tracked. If the ratio of available oxygen molecules to fuel molecules is larger than the value of the expression $$\text{``}\frac{3n+1}{2}\text{,''}$$

the combustion is fuel-lean. On the other hand, if the ratio of available oxygen molecules to fuel molecules is smaller than the value of the expression $$\text{``}\frac{3n+1}{2}\text{,''}$$

the combustion is fuel-rich. Additionally, if the ratio of available oxygen molecules to fuel molecules is equal to the value of the expression $$\text{``}\frac{3n+1}{2}\text{,''}$$

the combustion is stoichiometric. Temporarily ignoring the nitrogen ($N_2$), because it is neither consumed nor produce, these three cases are represented schematically in FIG. 3.

Figure 3:
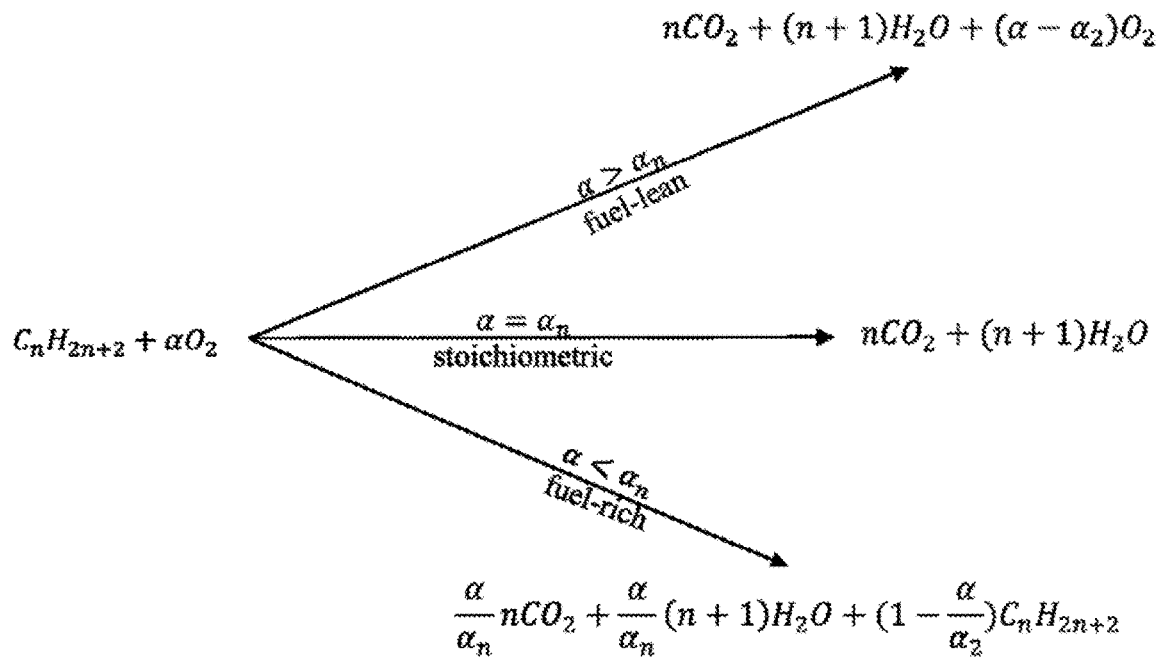
FIG. 3 is a diagram illustrating combustion products obtained when a combustion, involving a combustion fuel ($C_nH_{2n+2}$), is fuel-lean, stoichiometric, and fuel-rich with respect to oxygen in an atmosphere ($\alpha O_2$).

FIG. 3 is a diagram illustrating combustion products obtained when a combustion, involving a combustion fuel ($C_nH_{2n+2}$), is fuel-lean, stoichiometric, and fuel-rich with respect to oxygen in an atmosphere ($\alpha O_2$). As illustrated in FIG. 3, the fuel-lean condition is met when $\alpha > \alpha_n$ for the combustion of $C_nH_{2n+2} + \alpha O_2$. The combustion products for the fuel-lean condition are thus $nCO_2 + (n+1)H_2O + (\alpha - \alpha_2)O_2$. For the stoichiometric condition of $\alpha = \alpha_n$ for the combustion of $C_nH_{2n+2} + \alpha O_2$, the combustion products include $nCO_2 + (n+1)H_2O$. For the fuel-rich condition of $\alpha < \alpha_n$ for the combustion of $C_nH_{2n+2} + \alpha O_2$, the combustion products can be written as $$\frac{\alpha}{\alpha_n}nCO_2 + \frac{\alpha}{\alpha_n}(n+1)H_2O + \left(1 - \frac{\alpha}{\alpha_2}\right)C_nH_{2n+2}.$$

The constant $\alpha_n$ is defined by Equation 32 as $$\alpha_n = \frac{3n+1}{2}.$$

In Equation 33, the coefficient "α" represents the actual oxygen to fuel ratio. Thus, the fuel-to-oxidizer equivalence ratio (represented by the variable "λ") for this reaction may be determined by Equation 33.

$$\gamma = \frac{\alpha_n}{\alpha} = \frac{3n+1}{2\alpha} \quad \text{(Eqn. 33)}$$

Figure 4:
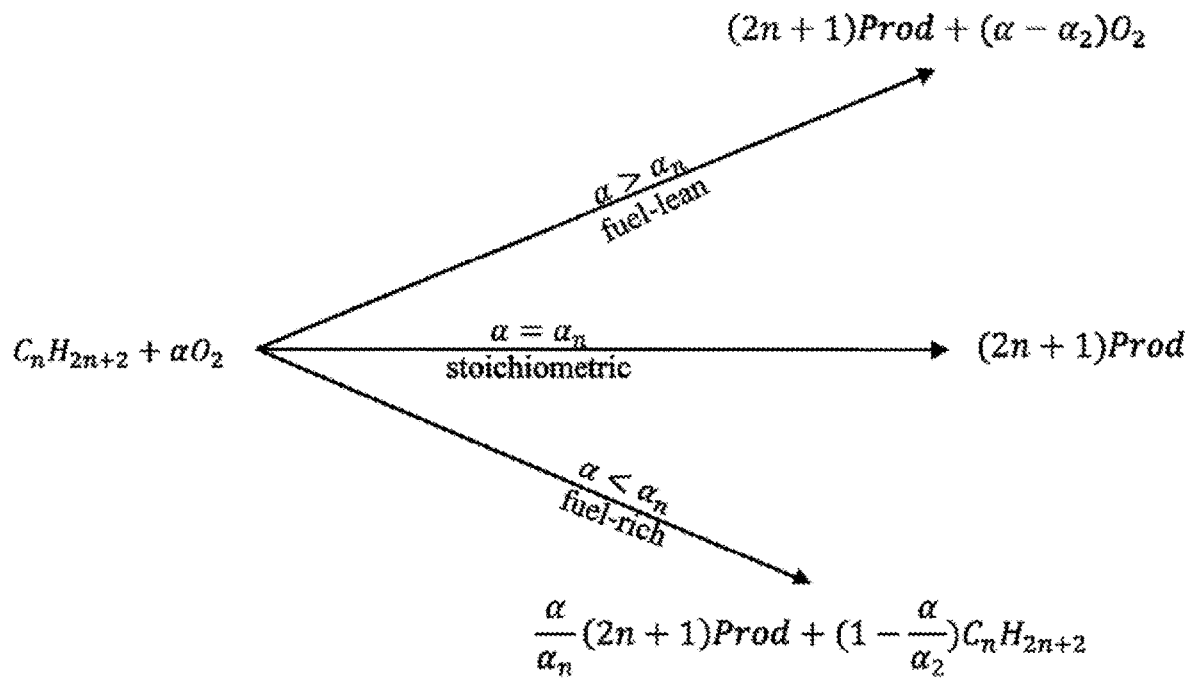
FIG. 4 is a version of the diagram of FIG. 3 that is simplified by combining carbon dioxide ($CO_2$) and water vapor ($H_2O$) into a single product labeled "Prod."

If the thermodynamic and chemical properties of carbon dioxide ($CO_2$) and water vapor ($H_2O$) are assumed to be the same (which is a reasonably good approximation), they can be combined into a single type of product, denoted "Prod." This means one less chemical component needs to be tracked and leads to a simpler diagram illustrated in FIG. 4.

FIG. 4 is a version of the diagram of FIG. 3 that is simplified by combining carbon dioxide ($CO_2$) and water vapor ($H_2O$) into a single product labeled "Prod." As illustrated in FIG. 4, the fuel-lean condition is met when $\alpha > \alpha_n$ for the combustion of $C_nH_{2n+2} + \alpha O_2$. The combustion products for the fuel-lean condition can be rewritten as $(2n+1)$Prod$+(\alpha-\alpha_2)O_2$. For the stoichiometric condition of $\alpha = \alpha_n$ for the combustion of $C_nH_{2n+2} + \alpha O_2$, the combustion products can be rewritten as $(2n+1)$Prod. For the fuel-rich condition of $\alpha < \alpha_n$ for the combustion of $C_nH_{2n+2} + \alpha O_2$, the combustion products can be written as $$\frac{\alpha}{\alpha_n}(2n+1)Prod + \left(1 - \frac{\alpha}{\alpha_2}\right)C_nH_{2n+2}.$$

A characteristic feature of non-premixed combustion of hydrocarbon fluid (e.g., diffusion flames) is the formation of soot, which is generally agreed to occur within a temperature range of 1300 K to 1600 K. While the chemistry and physics of soot formation in diffusion flames is exceedingly complex, it can be simplified. Equation 34 describes equilibrium. In Equation 34, an expression "$K_n^{\ominus}(T)$" represents an equilibrium constant defined as a ratio of a concentration of soot to fuel.

$$C_nH_{2n+2} \xrightarrow{K_n^{\ominus}(T)} Soot \quad \text{(Eqn. 34)}$$

The equilibrium constant is assumed to be constant within the temperature range of 1300 K to 1600 K and zero otherwise. The value of the equilibrium constant depends at least in part on the type of fuel and may be available in a look-up-tables and/or included in the combustion data 150 (see FIG. 1). The value of the equilibrium constant is notably zero for methane at all temperatures, because combustion of this type of fuel in a diffusion flame does not produce soot in significant quantities.

Soot is small particles (typically 10-100 nanometers) with 3000-10000 atomic mass units formed by a complex process of chemical reactions and coagulation. Though these particles are technically solids, the particles are small enough to be suspended and transported by the fluid flow. These hot soot particles are incandescent and emit a characteristic yellow glow, which gives rise to the term "luminous flames" for the diffuse (or non-premixed) flames that form soot. Conversely, flames that do not form soot are called non-luminous flames.

During the formation of soot, typically interior to the flame-front, no oxidizer is present, but as the hot soot is ejected by buoyancy forces (caused by local density differences), the hot soot will invariably cross into regions (primarily at the flame tip) with oxidizer where the hot soot will react with the oxidizer to form products. Equation 35 (crudely) models this reaction. In Equation 35, a parameter "β" scales with the size of the soot particles (or more precisely the number of carbon atoms per soot particle), and an expression "$K_{soot}^{\ominus}(T)$" represents a temperature dependent equilibrium constant that depends on the fuel source and size of the flame.

$$Soot + \beta O_2 \xrightarrow{K_{soot}^{\ominus}(T)} \beta \, Prod \quad \text{(Eqn. 35)}$$

If all of the soot particles are oxidized, the flame is said to be non-sooting and otherwise the flame is referred to as sooting. In other words, even flames that are not accompanied by raising (or visible) soot might still be producing soot internally and hence be luminous flames. Non-luminous flames are always non-sooting, and sooting flames are always luminous flames.

When temperatures are high (typically around 2500K) products (e.g., $H_2O$) start to undergo chemical reactions themselves, that is the products separate or split into smaller molecules or atoms, a process that is referred to as dissociation. For example, carbon dioxide may dissociate into carbon monoxide (CO) and oxygen (O). To help reduce the number of chemical species, the combustion model 170 may ignore dissociation.

The combustion model 170 may track the following five chemical species: $C_nH_{2n+2}$, oxygen ($O_2$), nitrogen ($N_2$), Prod, and Soot. But, if the combustion model 170 represents each species as molar fractions, the combustion model 170 only needs to track four quantities because the fifth quantity can be derived or calculated from the other four quantities because the sum of all of the molar fractions must be one. In other words, the reduction in the number of quantities from five to four can enable a more efficient way to simulate the combustion model approximately, for example, by 20 percent, while keeping the sum of all of the molar fractions to be one. This can be accomplished, for example, by reducing the number of combustion products, as described above with respect to FIG. 4. In such instances, the combustion products for the fuel-lean condition can be rewritten from $nCO_2+(n+1)H_2O+(\alpha-\alpha_2)O_2$ to $(2n+1)$Prod$+(\alpha-\alpha_2)O_2$. Similarly, the combustion products for the stoichiometric condition can be rewritten $nCO_2+(n+1)H_2O$ to $(2n+1)$Prod. On the other hand, the combustion products for the fuel-rich condition can be rewritten from $$\frac{\alpha}{\alpha_n}nCO_2 + \frac{\alpha}{\alpha_n}(n+1)H_2O +$$

-continued $$\left(1-\frac{\alpha}{\alpha_2}\right)C_nH_{2n+2} \text{ to } \frac{\alpha}{\alpha_n}(2n+1)Prod + \left(1-\frac{\alpha}{\alpha_2}\right)C_nH_{2n+2}.$$

By reducing the number of combustion byproducts, simulations can be performed in few number of computing cycles compared to tracking all possible chemical species or byproducts.

Referring to FIG. 2, as mentioned above, the fire-triangle 200 includes the heat 240 that is required to ignite the combustion 210. Technically, this is referred to as activation energy needed to kick start a self-sustained chemical reaction and it is often quantified as the auto-ignition temperature. The auto-ignition temperature is the lowest temperature at which combustion is initiated (given the presence of both fuel and oxidizer). In Table 1 below, ignition temperatures are listed in both Celsius and kelvin for the eight first hydrocarbons of the form "$C_nH_{2n+2}$". As a general rule, ignition temperatures decrease as the size of the molecules increase. The auto-ignition temperatures shown in Table 1 may be included in the combustion data 150 (see FIG. 1).

TABLE 1

Auto-ignition temperatures for the first eight hydrocarbons

| Name | Methane | Ethane | Propane | Butane | Pentane | Hexane | Heptane | Octane |
| --- | --- | --- | --- | --- | --- | --- | --- | --- |
| Formula | $CH_4$ | $C_2H_6$ | $C_3H_8$ | $C_4H_{10}$ | $C_5H_{12}$ | $C_6H_{14}$ | $C_7H_{16}$ | $C_8H_{18}$ |
| Celsius | 580° C. | 515° C. | 455° C. | 405° C. | 260° C. | 225° C. | 215° C. | 220° C. |
| Kelvin | 853 K | 788 K | 728 K | 678 K | 533 K | 498 K | 488 K | 493 K |

Adiabatic Flame Temperature

At this point, a model for the chemical reaction of combustion has been provided along with a measure of heat at constant thermodynamic pressure (enthalpy, cf. Equation 21). The chemistry module 164 may use this information to compute the temperature obtained by the simulated combustion event. As mentioned above, the combustion model 170 assumes constant thermodynamic pressure in open air. Additionally, the combustion model 170 assumes the chemical reaction of combustion happens very fast (e.g., virtually instantaneously), which means the release of chemical heat has no time to be exchanged (as thermal heat) with the surroundings, resulting in an adiabatic isobaric combustion process. As shown in Equation 22, this implies that the total enthalpy for the combustion is conserved (or is zero). This enthalpy originates from the chemical reaction and is manifested as reactants at the initial temperature transforming into products at the final temperature. Normally, the initial temperature of the reactants is known, so the challenge is to compute the higher unknown final temperature of the products based on the conservation of energy, which for adiabatic isobaric combustion equals enthalpy. The higher unknown final temperature of the products for adiabatic isobaric combustion is referred to as an adiabatic flame temperature.

Hess's law may be used to compute the adiabatic flame temperature. Hess's law states that a total change of enthalpy for a reaction is independent of a number of steps or stages of the reaction. In other words, the total enthalpy is the same whether the reaction is completed in one step or includes multiple steps. This is a consequence of enthalpy being a state variable, which means enthalpy is independent of the pathway from the reactants to the products of the chemical reaction. Combining Hess's law with the assumption of adiabatic isobaric combustion means that the total enthalpy change occurring in multiple sub-steps must remain zero. This is important because it allows changes of enthalpies for sub-steps to be measured and tabled at fixed conditions and later applied to reactions that take place under different conditions. For example, changes of enthalpies for sub-steps may be included in the combustion data 150 (see FIG. 1).

Figure 5:
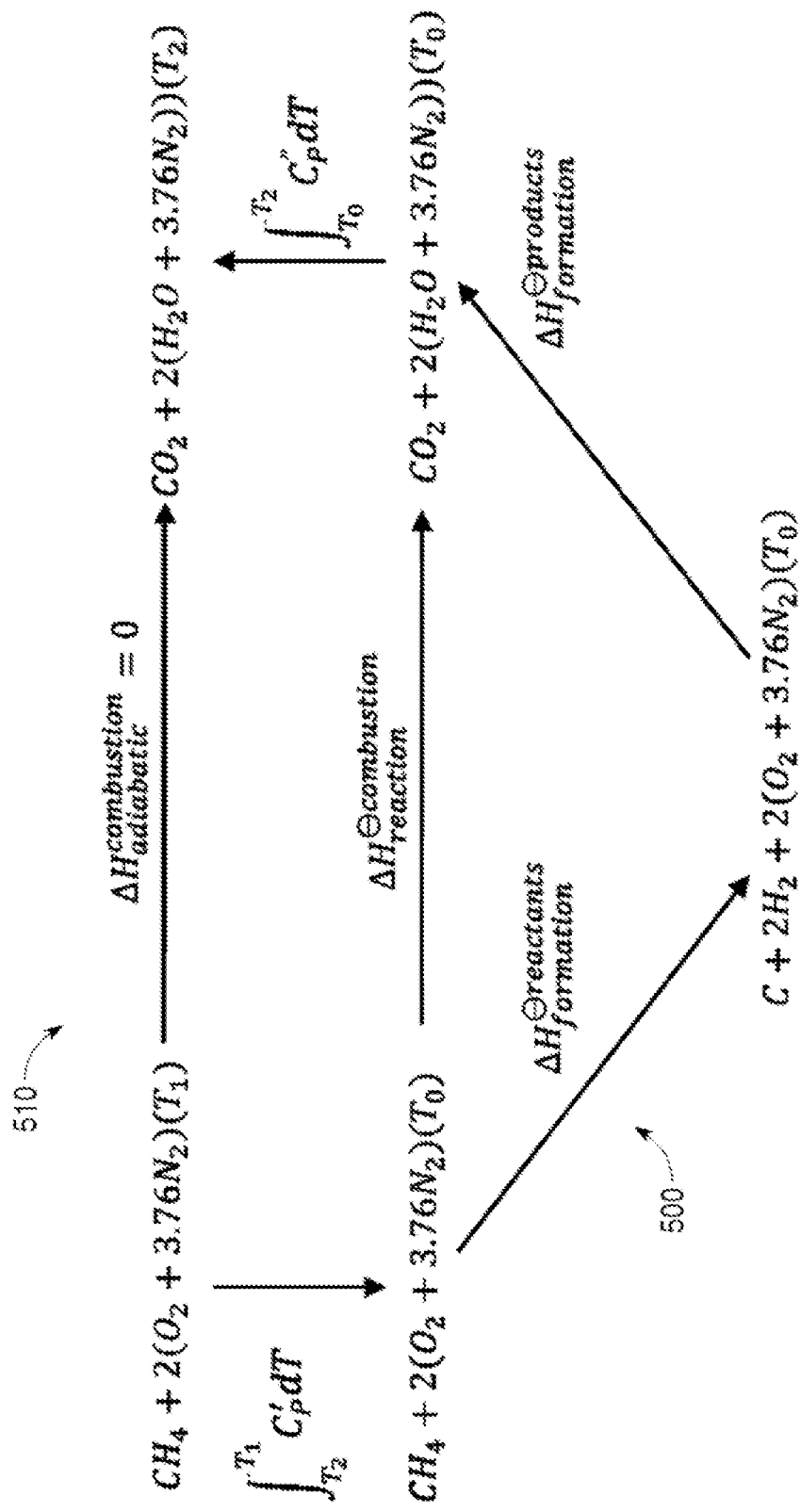
FIG. 5 illustrates different types of enthalpy for combustion of methane in air.

FIG. 5 illustrates different types of enthalpy for stoichiometric combustion of methane in air. Specifically, the diagram of FIG. 5 shows enthalpy changes for a chemical reaction at initial temperature (represented by the variable "$T_1$"), and final temperature (represented by the variable "$T_2$"). Both the initial and final temperatures are different from a standard temperature (represented by the variable "$T_0$"). By way of a non-limiting example, the standard temperature may be a temperature (e.g., 298.15 K) at which enthalpy of formation (represented by an expression "$\Delta H_{formation}^{\ominus}$") is known. The enthalpy of formation is defined as an enthalpy change occurring during the formation of one mole of a substance from its constituent elements at standard states (symbolized by $\ominus$).

By definition enthalpy is conserved for any adiabatic reaction at constant thermodynamic pressure. Equation 36 expresses the enthalpy of the reaction (represented by an expression "$\Delta H_{reaction}^{\ominus combustion}$") as a difference between the enthalpy of formation for the products (represented by an expression "$\Delta H_{formation}^{\ominus products}$") and the enthalpy of formation for the reactants (represented by an expression "$\Delta H_{formation}^{\ominus reactants}$").

$$\Delta H_{reaction}^{\ominus combustion} = \Delta H_{formation}^{\ominus products} - \Delta H_{formation}^{\ominus reactants} \quad \text{(Eqn. 36)}$$

Equation 36 is represented by a cyclic connection of a lower triangle 500 in FIG. 5. The cyclic connection represented by an upper rectangle 510 in FIG. 5 can be express as Equation 37.

$$\Delta H_{adiabatic}^{combustion} = \int_{T_1}^{T_0} C_P' dT + H_{reaction}^{\ominus combustion} + \int_{T_0}^{T_2} C_P'' dT = 0 \quad \text{(Eqn. 37)}$$

Combining Equation 36 and Equation 37 leads to Equation 38 below.

$$\Delta H_{adiabatic}^{combustion} = \int_{T_1}^{T_0} C_P' dT + H_{formation}^{\ominus products} - \Delta H_{formation}^{\ominus reactants} + \int_{T_0}^{T_2} C_P'' dT = 0 \quad \text{(Eqn. 38)}$$

Equation 38 is schematically represented as the cyclic connection of all five stages in FIG. 5. Note that while nitrogen ($N_2$) has no effect on the enthalpy of formation (or the enthalpy of reaction), nitrogen ($N_2$) does affect the sensible enthalpy (the two integrals over specific heat capacity). In other words, the presence of nitrogen lowers the adiabatic flame temperature because heat is required to increase the temperature of the adiabatic flame temperature. Because atmospheric air is made up of 78.2% nitrogen (and only 21% oxygen), nitrogen ($N_2$) can have a significant effect on the actual temperature of a flame, which is why the combustion model 170 accounts for nitrogen ($N_2$).

Enthalpy of formation for most chemicals is available in tables and may be included in the combustion data 150 (see FIG. 1). Therefore, by using polynomial (or constant)

approximations of the specific heat capacities (cf. Equation 27), Equation 38 can be solved for the final temperature (represented by the variable "$T_2$") when the initial temperature (represented by the variable "$T_1$") is known. The final temperature is referred to as the adiabatic flame temperature.

Heat Transfer

While the adiabatic flame temperature is fixed (when the initial temperature and the chemical reaction are known), surrounding gases that are not undergoing chemical combustion are subject to various processes that change the temperature locally. Simply stated, heat transfer can be defined as a passage of thermal energy from a first (hotter) material to a second (colder) material. This "passage" occurs typically via three distinct processes, namely, convection (or advection), conduction (or diffusion), and radiation. Physically, convection corresponds to heat (or thermal energy) transfer due to material transport, conduction corresponds to temperature differences of materials in contact, and radiation corresponds to electromagnetic emission and absorption.

Deriving the transport and diffusion equations are relatively straightforward for incompressible fluids, but the combustion model 170 explicitly allows for variable density (as well as temperature). Below, derivations of the heat transfer equation used by the combustion model 170 are provided.

Convection

As a gas is being advected by a fluid velocity field, the temperature, which is a material property of the molecules of the gas, undergoes the same transport. Equation 39 calculates a thermal energy (or heat) per unit volume (represented by a variable "$Q_{den}$") contained in a fluid as a function of the density (represented by the variable "$\rho$"), an absolute temperature (represented by the variable "T"), and the specific heat capacity at constant thermodynamic pressure (represented by the variable "$C_P$"). The thermal energy (or heat) per unit volume is sometimes referred to as a thermal energy density of the fluid.

$$Q_{den} = \rho C_P T \quad \text{(Eqn. 39)}$$

Next, consider a small volume of fluid (represented by a variable "$\Omega$") with a surface area (represented by an expression "$\partial \Omega$"). The rate of change of thermal heat in the volume of fluid (represented by the variable "$\Omega$") may be expressed by Equation 40 and Equation 41. In Equation 40 and Equation 41, it is assumed that the specific heat capacity (represented by the variable "$C_P$") is time-independent within the volume of fluid (represented by the variable "$\Omega$"), and the volume of fluid is fixed in time.

$$\frac{\partial Q_{den}}{\partial t} = \frac{\partial}{\partial t} \int_\Omega \rho C_P T dV = \int_\Omega \frac{\partial}{\partial t}(\rho C_P T) dV \quad \text{(Eqn. 40)}$$

$$= \int_\Omega C_P \left( T \frac{\partial \rho}{\partial t} + \frac{\partial T}{\partial t} \right) dV \quad \text{(Eqn. 41)}$$

If the fluid is moving with a velocity (represented by a variable "$\vec{u}$"), the heat flux due to advection may be expressed as "$\vec{J}_{adv} = \rho C_P T \vec{u}$" and the rate of change of thermal heat due to motion is given by Equation 42 and Equation 43 below.

$$\frac{\partial Q_{adv}}{\partial t} = \oint_{\partial \Omega} \vec{n} \cdot \vec{J}_{adv} dS = \int_\Omega \nabla \cdot \vec{J}_{adv} dV = \int_\Omega \nabla \cdot (C_P \rho \vec{u} T) dV \quad \text{(Eqn. 42)}$$

$$= \int_\Omega C_P (T \nabla \cdot (\rho \vec{u}) + \rho \vec{u} \cdot \nabla T) dV \quad \text{(Eqn. 43)}$$

If (for now) convection (or fluid motion) is assumed to be the only mechanism of heat transfer, conservation of energy implies that the sum of Equation 41 and Equation 43 is zero. This relationship is shown in Equation 44 below.

$$\frac{\partial Q_{den}}{\partial t} = \frac{\partial Q_{den}}{\partial t} = 0 \quad \text{(Eqn. 44)}$$

After some re-factoring this leads to Equation 45 below, which in turn implies (since the volume of fluid represented by the variable "$\Omega$" is arbitrary) that the kernel of the volume integral must be zero.

$$\int_\Omega C_P \left( T\left(\frac{\partial \rho}{\partial t} + \nabla \cdot (\rho \vec{u})\right) + \rho\left(\frac{\partial T}{\partial t} + \vec{u} \cdot \nabla T\right)\right) dV = 0 \quad \text{(Eqn. 45)}$$

As explained above, the continuity equation (Equation 6) may be expressed as $$\frac{\partial \rho}{\partial t} + \nabla \cdot (\rho \vec{u}) = 0,$$

which when combined with $\rho > 0$ and $C_P > 0$ leads to Equation 46 below. Equation 46 is a transport equation for the absolute temperature, which is a prototypical hyperbolic transport equation.

$$\frac{\partial T}{\partial t} = -\vec{u} \cdot \nabla T \quad \text{(Eqn. 46)}$$

Equation 46 resembles Equation 11, which is the transport equation for density in an incompressible flow. While Equation 46 models the physical phenomena of convection, the mathematical terminology is (hyperbolic) advection.

Conduction

Conduction is the transport of heat caused by physical contact between (instead of motion by) molecules. Heat flux (represented by a variable "$\vec{J}_{dif}$") may be measured in energy per unit time and unit area (e.g., W/m²). Equation 47 is Fourier's law. According to Fourier's law, the heat flux through a surface is proportional to a negative gradient of the temperature (e.g., measured in K/m) across the surface (represented by an expression "$\nabla T$"). In Equation 47, a variable "k" represents the thermal conductivity (e.g., measured in W/mK). The thermal conductivity (represented by the variable "k") may be 0.026 W/(mK) for air. The subscript "dif" in the variable "$\vec{J}_{dif}$" refers to diffusion, which is the fundamental mechanism for this type of heat transfer.

$$\vec{J}_{dif} = -k \nabla T \quad \text{(Eqn. 47)}$$

Integrating the heat flux over the surface area (represented by the expression "$\partial \Omega$") of a small fluid volume (represented by the variable "$\Omega$") yields Equation 48 and Equation 49.

$$\frac{\partial Q_{dif}}{\partial t} = \oint_{\partial \Omega} \vec{n} \cdot \vec{J}_{dif} dS = \int_{\Omega} \nabla \cdot \vec{J}_{dif} dV = -\int_{\Omega} k \nabla \cdot \nabla T \, dV \quad \text{(Eqn. 48)}$$

$$= -\int_{\Omega} k \nabla^2 T \, dV \quad \text{(Eqn. 49)}$$

Combining the effects of advection and diffusion implies Equation 50 and Equation 51 below.

$$\frac{\partial Q_{den}}{\partial t} = \frac{\partial Q_{adv}}{\partial t} + \frac{\partial Q_{dif}}{\partial t} = 0 \quad \text{(Eqn. 50)}$$

$$\int_{\Omega} \left( C_P T \left( \frac{\partial \rho}{\partial t} + \nabla \cdot (\rho \vec{u}) \right) + C_P \rho \left( \frac{\partial T}{\partial t} + \vec{u} \cdot \nabla T \right) - k \nabla^2 T \right) dV = 0 \quad \text{(Eqn. 51)}$$

When $$\frac{\partial \rho}{\partial t} + \nabla (\rho \vec{u}) = 0, \rho > 0,$$

and $C_P > 0$, Equation 52, which is a PDE, may be obtained.

$$\frac{\partial T}{\partial t} = -\vec{u} \cdot \nabla T + \frac{k}{\rho C_P} \nabla^2 T \quad \text{(Eqn. 52)}$$

A first term "$-\vec{u} \cdot \nabla T$" on the right-hand-side of Equation 52 accounts for transport (advection) and a second term $$\text{“} \frac{k}{\rho C_P} \nabla^2 T \text{”}$$

on the right-hand-side of Equation 52 models PCP diffusion though the Laplacian differential operator. Physicists refer to this as convection-diffusion whereas mathematicians tend to call it advection-diffusion. Equation 52 reduces to Equation 53 below if the fluid is assumed to be stationary, $\vec{u} = \vec{0}$.

$$\frac{\partial T}{\partial t} = \alpha \nabla^2 T \quad \text{(Eqn. 53)}$$

In Equation 53, $$\alpha \equiv \frac{k}{\rho c_P}$$

is known as the thermal diffusivity of the medium. Equation 53 is a prototypical parabolic PDE, which is simply dubbed "the heat equation." But, it is important to note that Equation 53 accounts for only one of three fundamental mechanisms of heat transfer, namely conduction. Equation 52, which was derived for heat advection-diffusion for a compressible fluid model, is actually identical to its incompressible counterpart, typically employed in computer graphics. This implies that a computer process computing values using Equation 52 would not have to deal with additional complications in its numerical implementation.

Solving the heat equation may be computationally expensive. But, a well-known mathematical technique exists for obtaining a general or fundamental solution to many PDEs, like the heat equation. Thus, a fundamental solution may be generated for the heat equation (and included in the combustion data 150). Then, concrete solutions can be generated from the fundamental solution using convolution. In computer graphics, convolution causes or is depicted as blurring. Such blurring may be applied to a visual representation using a convolution kernel (e.g., a Gaussian kernel). Thus, solving the heat equation may be reduced to blurring with a convolution kernel, which can be done efficiently. The convolution kernel may be derived from the heat equation. The size of the convolution kernel may be based at least in part on the timestamp (or time step), and the viscosity or the diffusion coefficient. For example, smaller timestamps (or time steps) may yield smaller convolution kernels.

Radiation

Heat transfer caused by electromagnetic radiation is notoriously difficult to model since such heat transfer is based on complex interactions over long distances (much like global illumination). As such, the combustion model 170 aims at capturing the essence of heat transfer caused by electromagnetic radiation and model it with an additional term to the convection-diffusion PDE (Equation 52) that approximates its behavior.

A simple classical model for thermal radiation is the blackbody model and radiation from an idealized blackbody model can be expressed by Planck's law, which is Equation 54 below.

$$\frac{\partial Q_{black}(T\lambda)}{\partial t} = \frac{2\pi c^2 h}{\lambda^5} \left( \exp\left( \frac{ch}{\lambda kT} \right) - 1 \right)^{-1} \quad \text{(Eqn. 54)}$$

Planck's law describes an amount of heat (or energy) emitted per unit time, wavelength, and surface area from an idealized blackbody model as a function of its absolute temperature (represented by a variable "T") when the absolute temperature is greater than zero. When integrated over all wavelengths (represented by a variable "λ"), Planck's law reduces to Equation 55, which is known as the Stefan-Boltzmann law.

$$\frac{\partial Q_{black}(T)}{\partial t} = \int_0^\infty \frac{\partial Q_{black}(T\lambda)}{\partial t} d\lambda = \frac{2\pi^5 k^4 T^4}{15 c^2 h^3} \equiv \sigma T^4 \quad \text{(Eqn. 55)}$$

Equation 55 includes the Stefan-Boltzmann constant $$\text{“} \sigma \equiv \frac{2\pi^5 k^4}{15 c^2 h^3} = 5.670373 \times 10^{-8} W m^{-2} K^{-4}, \text{”}$$

in which the variable "k" represents the Boltzmann constant, a variable "c" represents the speed of light in vacuum, and a variable "h" represents Planck's constant. To allow for this simple power law to be applied to more general materials (sometimes called graybody materials), Equation 56 below introduces a unit-less parameter "E." In Equation 56, a variable "$\vec{J}_{rad}$" represents an effect (e.g., measured in in watts (or J/s) per unit area (m²)) emitted in the normal direction (represented by a variable "n") at all frequencies from a body with the temperature represented by the variable "T." The temperature may be measured in Kelvin (K). When the parameter "E" has a value that is greater than zero and less than or equal to one, the emissivity is that of a graybody. The parameter "E" is equal to one for an ideal blackbody.

$$\vec{J}_{rad} = \in \sigma T^4 \vec{n} \qquad \text{(Eqn. 56)}$$

Several problems arise when a model of thermal radiation for combustion is based on the Stefan-Boltzmann law. First, the model would apply only to solids and not gases. So, soot is actually the only material in the combustion model 170 that can be reasonably modeled by the Stefan-Boltzmann law. In fact, this is a fairly good model for the incandescence of luminous flames, but not for the light emission from the hot gases. Second, solving heat transfer due to blackbody radiation in a fluid, despite the deceivingly simple power relation, is exceedingly complicated. In fact, so much so that many scientific simulation techniques approximate and even ignore this effect. The reason is for this is that this resembles global illumination in complexity where all materials are simultaneously emitting and absorbing photons. The combustion model 170 attempts to model this phenomena with a term that at least captures the essence of this mechanism under severe assumptions. As such, the following may be considered an approximation.

If a graybody with a temperature (represented by the variable "T") is embedded in an ambient space with a constant temperature (represented by the variable "$T_{amb}$"), the normal flux of radiation per surface area away from this body may be determined by Equation 57. In Equation 57, the variable "$\vec{n}$" represents the local surface normal of the graybody. Both the material temperature and ambient temperature (represented by the variables "T" and "$T_{amb}$," respectively) are measured in kelvin.

$$\vec{J}_{rad} = \in \sigma (T^4 - T_{amb}^4) \vec{n} \qquad \text{(Eqn. 57)}$$

For a volume (represented by the variable "$\Omega$") with a surface area (represented by the expression "$\partial \Omega$"), Equation 58 may be used to determine a total rate of change of energy due to heat flux.

$$\frac{\partial Q_{rad}}{\partial t} = \oint_{\partial \Omega} \vec{n} \cdot \vec{J}_{rad} dS = \int_{\Omega} \in \sigma \nabla \cdot ((T^4 - T_{amb}^4) \vec{n}) dV \qquad \text{(Eqn. 58)}$$

Equation 59 may be obtained when the volume (represented by the variable "$\Omega$") is a very small sphere, because both the temperature and the ambient temperature (represented by the variables "T" and "$T_{amb}$," respectively) can be assumed to be constant and $$\nabla \cdot \vec{n} = \frac{1}{r}$$

with a variable "r" representing the radius of the sphere. The radius may be conceptualized as being a characteristic length scale of the radiation model (such as the voxel size).

$$\frac{\partial Q_{rad}}{\partial t} = \int_{\Omega} \frac{\in \sigma}{r} (T^4 - T_{amb}^4) dV \qquad \text{(Eqn. 59)}$$

The total energy balance from heat exchange due to the combined effects of convection, conduction and radiation may be expressed as Equation 60 below.

$$\frac{\partial Q_{den}}{\partial t} + \frac{\partial Q_{adv}}{\partial t} + \frac{\partial Q_{dif}}{\partial t} + \frac{\partial Q_{rad}}{\partial t} = 0 \qquad \text{(Eqn. 60)}$$

Equation 60 implies Equation 61 below, which is an integral equation.

$$\int_{\Omega} \left( C_P T \left( \frac{\partial \rho}{\partial t} + \nabla \cdot (\rho \vec{u}) \right) + \rho C_P \left( \frac{\partial T}{\partial t} + \vec{u} \cdot \nabla T \right) - k \nabla^2 T + \frac{\in \sigma}{r} (T^4 - T_{amb}^4) \right) dV = 0 \qquad \text{(Eqn. 61)}$$

Finally, since Equation 61 must hold for any small spherical volume, Equation 62 below, which is a PDE, may be obtained for the absolute temperature. Equation 62 is an equation of evolution for temperature.

$$\frac{\partial T}{\partial t} = -\vec{u} \cdot \nabla T + \frac{k}{\rho C_P} \nabla^2 T - \frac{\in \sigma}{r \rho C_P} (T^4 - T_{amb}^4) \qquad \text{(Eqn. 62)}$$

The model of radiation may be considered to be a gross oversimplification because the ambient temperature (represented by the variable "$T_{amb}$") is far from constant in time or space, but the ambient temperature captures the spirit of radiative cooling. As such, the ambient temperature (represented by the variable "$T_{amb}$") is defined as an average temperature of the surroundings that exchange heat through radiation with the fluid.

Figure 6:
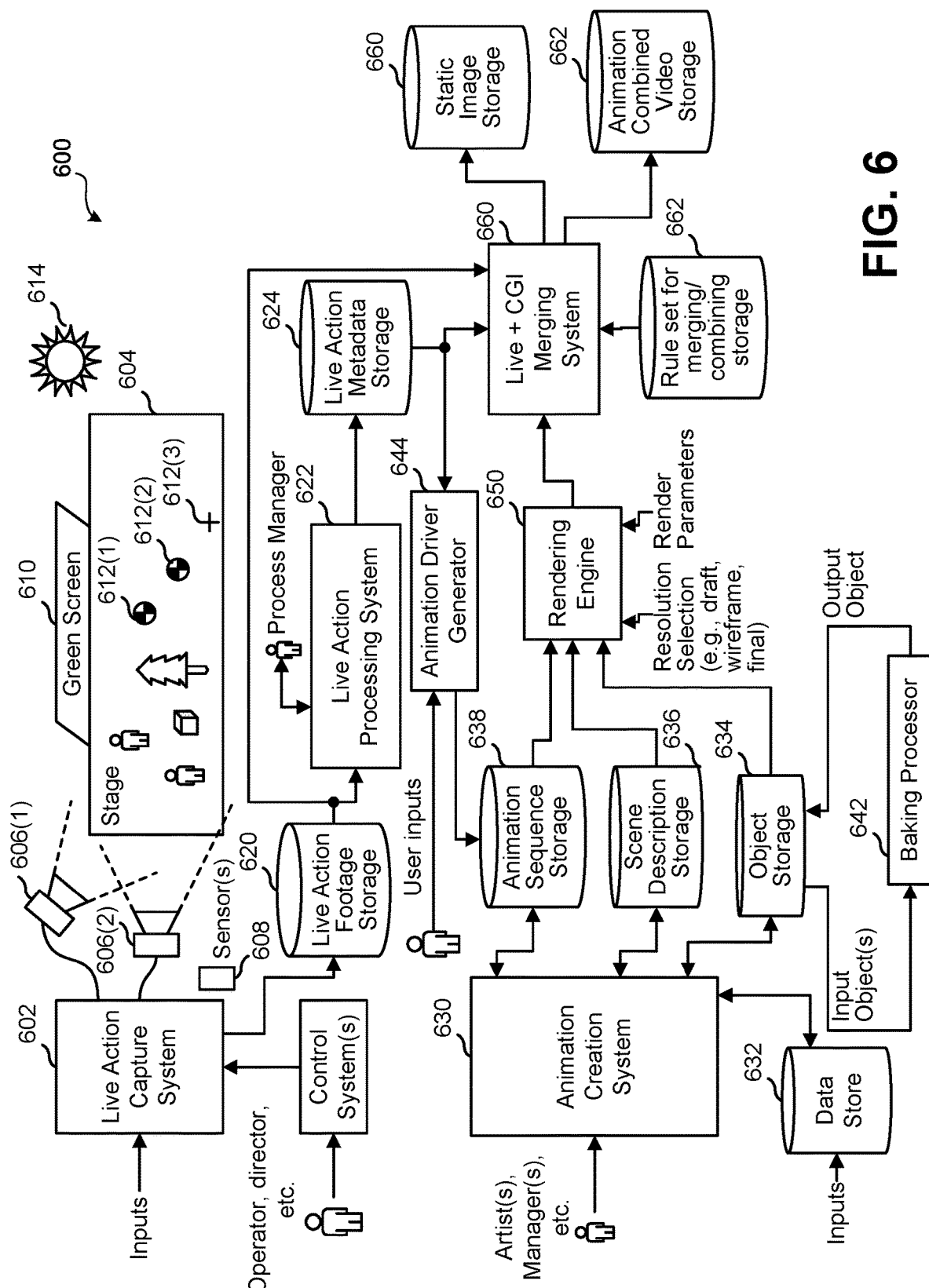
FIG. 6 illustrates an example visual content generation system as might be used to generate imagery in the form of still images and/or video sequences of images.

For example, FIG. 6 illustrates the example visual content generation system 600 as might be used to generate imagery in the form of still images and/or video sequences of images. Visual content generation system 600 might generate imagery of live action scenes, computer generated scenes, or a combination thereof. In a practical system, users are provided with tools that allow them to specify, at high levels and low levels where necessary, what is to go into that imagery. For example, a user might be an animation artist (like artist 142 illustrated in FIG. 1) and might use visual content generation system 600 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 600 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value is associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., artist 142 illustrated in FIG. 1) might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 6, a live action capture system 602 captures a live scene that plays out on a stage 604. Live action capture system 602 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 606(1) and 606(2) capture the scene, while in some systems, there might be other sensor(s) 608 that capture information from the live scene (e.g., infrared cameras, infrared sensors, motion capture ("mo-cap") detectors, etc.). On stage 604, there might be human actors, animal actors, inanimate objects, background objects, and possibly an object such as a green screen 610 that is designed to be captured in a live scene recording in such a way that it is easily overlaid with computer-generated imagery. Stage 604 might also contain objects that serve as fiducials, such as fiducials 612(1)-(3), that might be used post-capture to determine where an object was during capture. A live action scene might be illuminated by one or more lights, such as an overhead light 614.

During or following the capture of a live action scene, live action capture system 602 might output live action footage to a live action footage storage 620. A live action processing system 622 might process live action footage to generate data about that live action footage and store that data into a live action metadata storage 624. Live action processing system 622 might include computer processing capabilities, image processing capabilities, one or more processors, program code storage for storing program instructions executable by the one or more processors, as well as user input devices and user output devices, not all of which are shown. Live action processing system 622 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 614, as that might be useful in post-processing to match computer-generated lighting on objects that are computer-generated and overlaid on the live action footage. Live action processing system 622 might operate autonomously, perhaps based on predetermined program instructions, to generate and output the live action metadata upon receiving and inputting the live action footage. The live action footage can be camera-captured data as well as data from other sensors.

An animation creation system 630 is another part of visual content generation system 600. Animation creation system 630 might include computer processing capabilities, image processing capabilities, one or more processors, program code storage for storing program instructions executable by the one or more processors, as well as user input devices and user output devices, not all of which are shown. Animation creation system 630 might be used by animation artists, managers, and others to specify details, perhaps programmatically and/or interactively, of imagery to be generated. From user input and data from a database or other data source, indicated as a data store 632, animation creation system 630 might generate and output data representing objects (e.g., a horse, a human, a ball, a teapot, a cloud, a light source, a texture, etc.) to an object storage 634, generate and output data representing a scene into a scene description storage 636, and/or generate and output data representing animation sequences to an animation sequence storage 638.

Scene data might indicate locations of objects and other visual elements, values of their parameters, lighting, camera location, camera view plane, and other details that a rendering engine 650 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 630 might be interactive, allowing a user to read in animation sequences, scene descriptions, object details, etc. and edit those, possibly returning them to storage to update or replace existing data. As an example, an operator might read in objects from object storage into a baking processor 642 that would transform those objects into simpler forms and return those to object storage 634 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 632 might be used to drive object presentation. For example, if an artist is creating an animation of a spaceship passing over the surface of the Earth, instead of manually drawing or specifying a coastline, the artist might specify that animation creation system 630 is to read data from data store 632 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements.

An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 644 might read in live action metadata, such as data representing movements and positions of body parts of a live actor during a live action scene. Animation driver generator 644 might generate corresponding animation parameters to be stored in animation sequence storage 638 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 622. Animation driver generator 644 might convert that movement data into specifications of how joints of an articulated CGI character are to move over time.

A rendering engine 650 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 650 might include computer processing capabilities, image processing capabilities, one or more processors, program code storage for storing program instructions executable by the one or more processors, as well as user input devices and user output devices, not all of which are shown.

Visual content generation system 600 can also include a merging system 660 that merges live footage with animated content. The live footage might be obtained and input by reading from live action footage storage 620 to obtain live action footage, by reading from live action metadata storage 624 to obtain details such as presumed segmentation in captured images segmenting objects in a live action scene from their background (perhaps aided by the fact that green screen 610 was part of the live action scene), and by obtaining CGI imagery from rendering engine 650.

A merging system 660 might also read data from rulesets for merging/combining storage 662. A very simple example of a rule in a ruleset might be "obtain a full image including a two-dimensional pixel array from live footage, obtain a full image including a two-dimensional pixel array from rendering engine 650, and output an image where each pixel is a corresponding pixel from rendering engine 650 when the corresponding pixel in the live footage is a specific color of green, otherwise output a pixel value from the corresponding pixel in the live footage."

Merging system 660 might include computer processing capabilities, image processing capabilities, one or more processors, program code storage for storing program instructions executable by the one or more processors, as well as user input devices and user output devices, not all of which are shown. Merging system 660 might operate autonomously, following programming instructions, or might have a user interface or programmatic interface over which an operator can control a merging process. In some embodiments, an operator can specify parameter values to use in a merging process and/or might specify specific tweaks to be made to an output of merging system 660, such as modifying boundaries of segmented objects, inserting blurs to smooth out imperfections, or adding other effects. Based on its inputs, merging system 660 can output an image to be stored in a static image storage 670 and/or a sequence of images in the form of video to be stored in an animated/combined video storage 672.

Thus, as described, visual content generation system 600 can be used to generate video that combines live action with computer-generated animation using various components and tools, some of which are described in more detail herein. While visual content generation system 600 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 7:
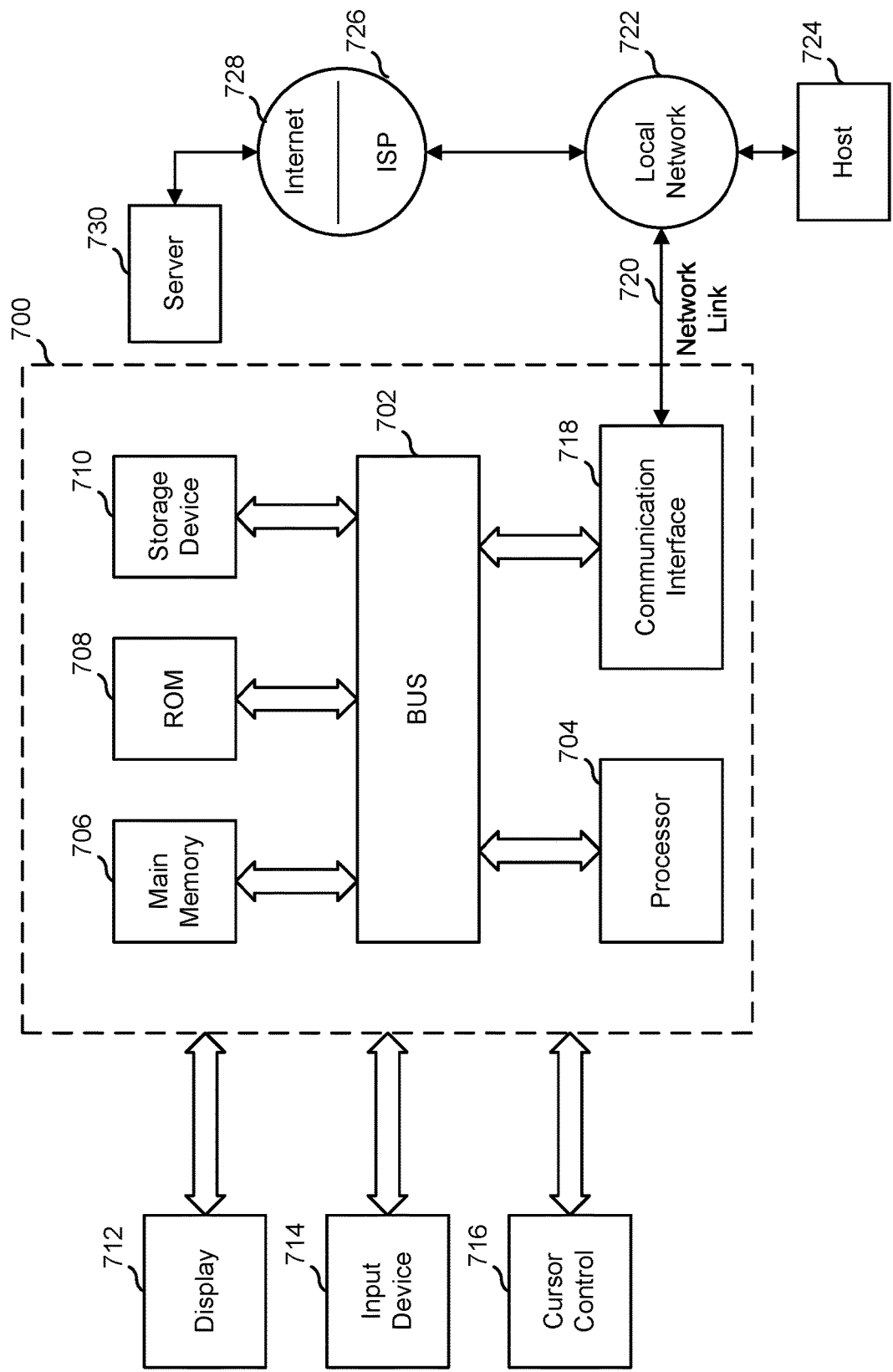
FIG. 7 is a block diagram illustrating an example computer system upon which computer systems of the systems illustrated in FIGS. 1 and 6 may be implemented.

For example, FIG. 7 is a block diagram that illustrates a computer system 700 upon which the computer systems of the systems described herein and/or visual content generation system 600 (see FIG. 6) may be implemented. Computer system 700 includes a bus 702 or other communication mechanism for communicating information, and a processor 704 coupled with bus 702 for processing information. Processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 may also be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a computer monitor, for displaying information to a computer user. An input device 714, including alphanumeric and other keys, is coupled to bus 702 for communicating information and command selections to processor 704. Another type of user input device is a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a network connection. A modem or network interface local to computer system 700 can receive the data. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be a network card, a modem, a cable modem, or a satellite modem to provide a data communication connection to a corresponding type of telephone line or communications line. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720, and communication interface 718. In the Internet example, a server 730 might transmit a requested code for an application program through the Internet 728, ISP 726, local network 722, and communication interface 718. The received code may be executed by processor 704 as it is received, and/or stored in storage device 710, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of simulating combustion processes, the computer-implemented method comprising:
   under the control of one or more computer systems configured with executable instructions:
   receiving a first set of data representing a fluid flow in an ambient fluid medium, the fluid flow including a plurality of combustion precursors comprising a first molar mass of an identified fuel molecule and a second molar mass of an identified oxidizer molecule;
   simulating a chemical reaction representing simulated combustion of at least some of the first molar mass with a proportionate quantity of the second molar mass within the ambient fluid medium, generating combustion byproducts;
   determining a change in temperature of the combustion byproducts due to the chemical reaction;
   determining a change in the first molar mass and the second molar mass due to the chemical reaction;
   determining a divergence of the combustion byproducts based on a combination of the change in the temperature and the change in the first molar mass and second molar mass;
   generating one or more data structures of the simulated combustion based on values of at least a first portion of the fluid flow; and
   generating a visual representation of the simulated combustion in the ambient fluid medium based on the one or more data structures.

2. The computer-implemented method of claim 1, wherein the plurality of combustion precursors comprises a third molar mass of a second identified fuel molecule, and wherein the chemical reaction includes at least a portion of the third molar mass.

3. The computer-implemented method of claim 1, wherein the plurality of combustion precursors comprises at least one non-combustible component.

4. The computer-implemented method of claim 1, wherein the divergence is determined based on the change in temperature over time.

5. The computer-implemented method of claim 1, wherein the divergence is determined based on the change in the first molar mass and the second molar mass over time.

6. The computer-implemented method of claim 1, wherein the change in temperature and change in first molar mass and second molar mass occurs over a predetermined time step.

7. The computer-implemented method of claim 1, further comprising:
    simulating the combustion byproducts as a second portion of the fluid flow having a variable density, wherein the variable density of the fluid flow varies in response to the divergence of a velocity field pertaining to the fluid flow.

8. The computer-implemented method of claim 1, wherein at least a second portion of the fluid flow is treated as incompressible.

9. The computer-implemented method of claim 1, wherein at least a second portion of the fluid flow is treated as compressible.

10. The computer-implemented method of claim 1, wherein generating the one or more data structures of the simulated combustion based on a reduced number of the combustion byproducts.

11. The computer-implemented method of claim 1, wherein the one or more data structures are configured for use by an animation process when generating one or more visual representations of a combustion event.

12. The computer-implemented method of claim 11, further comprising:
    using a convolution kernel to simulate heat diffusion by blurring at least a portion of the one or more visual representations of the combustion event.

13. The computer-implemented method of claim 12, further comprising:
    deriving the convolution kernel from a heat equation.

14. The computer-implemented method of claim 1, wherein the plurality of combustion precursors is determined by a set of parameters defining an initiate state.

15. The computer-implemented method of claim 1, wherein the first molar mass comprises a linear alkane having a chemical composition with a form "$C_nH_{2n+2}$".

16. The computer-implemented method of claim 1, wherein the first molar mass comprises one or more of methane ($CH_4$), ethane ($C_2H_6$), propane ($C_3H_8$), butane ($C_4H_{10}$), pentane ($C_5H_{12}$), hexane ($C_6H_{14}$), heptane ($C_7H_{16}$), and octane ($C_8H_{18}$).

17. A computer system for simulating combustion processes, the system comprising:
    at least one processor; and
    a computer-readable medium storing instructions, which when executed by the at least one processor, causes the system to carry out the method of claim 1.

18. A non-transitory computer-readable storage medium storing instructions, which when executed by at least one processor of a computer system, causes the computer system to carry out the method of claim 1.

* * * * *